US008554601B1

(12) United States Patent
Marsh et al.

(10) Patent No.: US 8,554,601 B1
(45) Date of Patent: Oct. 8, 2013

(54) MANAGING CONTENT BASED ON REPUTATION

(75) Inventors: Brian David Marsh, Seattle, WA (US); Nikolas Clemens Gloy, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 3846 days.

(21) Appl. No.: 10/646,341

(22) Filed: Aug. 22, 2003

(51) Int. Cl.
*G06Q 10/00* (2012.01)

(52) U.S. Cl.
USPC .......................................................... 705/7.32

(58) Field of Classification Search
USPC .......................................................... 705/10
See application file for complete search history.

(56) References Cited

U.S. PATENT DOCUMENTS

| | | | |
|---|---|---|---|
| 5,537,618 A | 7/1996 | Boulton et al. |
| 5,867,799 A | 2/1999 | Lang et al. |
| 6,041,311 A | 3/2000 | Chislenko et al. |
| 6,064,980 A | 5/2000 | Jacobi et al. |
| 6,260,019 B1 | 7/2001 | Courts |
| 6,263,447 B1 | 7/2001 | French et al. |
| 6,334,127 B1 | 12/2001 | Bieganski et al. |
| 6,438,579 B1 | 8/2002 | Hosken |
| 6,466,917 B1 | 10/2002 | Goyal et al. |
| 6,505,202 B1 | 1/2003 | Mosquera et al. |
| 6,856,963 B1 | 2/2005 | Hurwitz |
| 6,892,178 B1 | 5/2005 | Zacharia |
| 6,892,179 B1 | 5/2005 | Zacharia |
| 6,895,385 B1 | 5/2005 | Zacharia et al. |
| 6,952,678 B2 * | 10/2005 | Williams et al. ................. 705/1 |
| 6,963,848 B1 | 11/2005 | Brinkerhoff |
| 7,007,232 B1 | 2/2006 | Ross et al. |
| 7,124,377 B2 | 10/2006 | Catthoor et al. |
| 7,143,089 B2 | 11/2006 | Petras et al. |
| 7,219,301 B2 | 5/2007 | Barrie et al. |
| 7,225,122 B2 | 5/2007 | Shaw |
| 7,231,395 B2 | 6/2007 | Fain et al. |
| 7,251,620 B2 | 7/2007 | Walker et al. |
| 7,257,767 B1 | 8/2007 | Carden, Jr. |
| 7,310,612 B2 | 12/2007 | McQueen, III et al. |
| 7,310,641 B2 | 12/2007 | Moore et al. |
| 7,428,496 B1 | 9/2008 | Keller et al. |
| 7,428,505 B1 | 9/2008 | Levy et al. |

(Continued)

OTHER PUBLICATIONS

Amrit Tiwana, Ashley Bush. Journal of Knowledge Management. Kempston: 2001. vol. 5, Iss. 3; p. 242 (7 pages).*

(Continued)

*Primary Examiner* — Jonathan G Sterrett
(74) *Attorney, Agent, or Firm* — Seed IP Law Group PLLC

(57) ABSTRACT

Techniques are described for managing various types of content in order to identify content having attributes of interest, such as based at least in part on automatically generated assessments of the reputations of authors of the content and/or of evaluators of the content. When content of sufficient interest is identified, it can then be provided to readers in various ways. In some situations, the content being evaluated and managed may include item reviews and/or how-to guides provided to a Web merchant by user authors, and in some situations may include information from blogs. Various types of awards can also be provided to authors and/or evaluators based on one or more of multiple types of reputation scores from their assessed reputations. This abstract is provided to comply with rules requiring it, and is submitted with the intention that it not reflect the limit of the scope of the claims.

52 Claims, 11 Drawing Sheets

(56) References Cited

U.S. PATENT DOCUMENTS

| | | | |
|---|---|---|---|
| 7,433,832 B1 | 10/2008 | Bezos et al. | |
| 7,461,051 B2 | 12/2008 | Lavine | |
| 7,467,206 B2 | 12/2008 | Moore et al. | |
| 7,478,054 B1 | 1/2009 | Adams et al. | |
| 7,487,217 B2 | 2/2009 | Buckingham et al. | |
| 7,539,938 B2 | 5/2009 | Ross et al. | |
| 7,552,068 B1 | 6/2009 | Brinkerhoff | |
| 7,552,365 B1 | 6/2009 | Marsh et al. | |
| 7,587,359 B2 | 9/2009 | Levy et al. | |
| 7,600,017 B2 | 10/2009 | Holtzman et al. | |
| 7,610,313 B2 | 10/2009 | Kawai et al. | |
| 7,664,699 B1 | 2/2010 | Powell | |
| 7,664,747 B2 | 2/2010 | Petras et al. | |
| 7,676,034 B1 | 3/2010 | Wu et al. | |
| 7,778,878 B2 | 8/2010 | Harding et al. | |
| 7,778,890 B1 | 8/2010 | Bezos et al. | |
| 7,783,528 B2 | 8/2010 | Musgrove et al. | |
| 7,805,518 B1 | 9/2010 | Kamvar et al. | |
| 8,140,380 B2 | 3/2012 | Keller et al. | |
| 8,229,782 B1 | 7/2012 | Adams et al. | |
| 8,290,809 B1 | 10/2012 | Ratterman et al. | |
| 8,321,496 B2 | 11/2012 | Wilson | |
| 2002/0004772 A1 | 1/2002 | Templeton et al. | |
| 2002/0046041 A1 | 4/2002 | Lang | |
| 2002/0107861 A1 | 8/2002 | Clendinning et al. | |
| 2002/0133365 A1 | 9/2002 | Grey et al. | |
| 2002/0198866 A1 | 12/2002 | Kraft et al. | |
| 2003/0014311 A1 | 1/2003 | Chua | |
| 2003/0236582 A1* | 12/2003 | Zamir et al. | 700/94 |
| 2004/0003401 A1* | 1/2004 | Gutta et al. | 725/46 |
| 2004/0122926 A1* | 6/2004 | Moore et al. | 709/223 |
| 2004/0230440 A1 | 11/2004 | Malhotra | |
| 2005/0034071 A1 | 2/2005 | Musgrove et al. | |
| 2006/0123348 A1 | 6/2006 | Ross et al. | |
| 2006/0143068 A1 | 6/2006 | Calabria | |
| 2007/0050192 A1 | 3/2007 | Gutta et al. | |

OTHER PUBLICATIONS

"Memory-Based Weighted-Majority Prediction", J Delgado, N Ishii—ACM SIGIR'99 Workshop on Recommender Systems: Algorithms . . . , 1999—Citeseer.*
The weighted majority algorithm—▶ psu.edu [PDF] N Littlestone, MK Warmuth—Foundations of Computer Science, 1989., 30th Annual . . . —ieeexplore.ieee.org.*
A Recommender System based on the Immune Network S Cayzer, U Aickelin—2002, research.hp.com.*
PolyLens: A recommender system for groups of users MO'Connor, D Cosley, JA Konstan, J Riedl—Proceedings of the European Conference on Computer . . . , 2001—cs.umn.edu.*
"Recommender systems: a GroupLens perspective", JA Konstan, J Riedl, A Borchers, JL . . . —. . . systems: Papers from the . . . , 1998—aaai.org.*
"DIVA: applying decision theory to collaborative filtering" H Nguyen, P Haddawy—. . . of the AAAI Workshop on Recommender Systems, 1998—aaai.org.*
A multiple attribute utility theory approach to ranking and selection jstor.org, J Butler, DJ Morrice, PW Mullarkey—Management Science, 2001—jstor.org.*
GroupLens: An open architecture for collaborative filtering of netnews P Resnick, N Iacovou, M Suchak, P . . . —Proceedings of the . . . , 1994—portal.acm.org.*
Integrating knowledge-based and collaborative-filtering recommender systems R Burke—Proceedings of the Workshop on AI and Electronic . . . , 1999—aaai.org.*
Opinity.com, "Opinity Launches First Online Reputation Service for Internet Users," Apr. 18, 2005, retrieved Jan. 5, 2006, from http://www.opinity.com/press/service_release_final.php, 2 pages.
Root.net, "Root/News," retrieved Dec. 20, 2005, from http://www.root.net/about/news, 3 pages.
Thompson, Nicholas, "More Companies Pay Heed to Their 'Word of Mouse' Reputation," The New York Times, Jun. 23, 2003 (3 pages) http://www.nytimes.com/2003/06/23/technology/23REPU.html?adx....

Welcome to the Reputation Research Network (1 page) http://databases.si.umich.edu/reputations/indexM.cfm [Accessed Aug. 4, 2003].
Papers on Reputation (7 pages) http://databases.si.umich.edu/reputations/bib/bibM.cfm [Accessed Aug. 4, 2003].
OSDN, Slashdot (21 pages) http://slashdot.org/faq/com-mod.shtml [Accessed Aug. 4, 2003].
OSDN, Slashdot (4 pages) http://slashdot.org/faq/metamod.shtml [Accessed Aug. 4, 2003].
Advogato's "Mission Statement" and "Trust Metric" (6 pages) http://www.advogato.com/trust-metric.html [Accessed Aug. 4, 2003].
eBay, Company Overview (2 pages) http://pages.ebay.com/community/aboutbay/overview/index.html [Accessed Aug. 4, 2003].
eBay, Company Overview, Trust, Safety and Privacy (2 pages) http://pages/ebay.com/community/aboutebay/overview/trusthtml [Accessed Aug. 4, 2003].
Reputation—eBay Feedback: Overview (1 page) http://pages.ebaby.com/help/confidence/reputation-stars.html [Accessed Aug. 4, 2003].
Reputation—eBay Feedback: Stars—Earning your stars through positive feedback, (1 page) http://pages.ebaby.com/help/confidence/reputation-stars.html [Accessed Aug. 4, 2003].
Epinions.com, About Epinions (2 pages), Copyright 1993-2003, Epinions, Inc. http://www.epinions.com/about/ [Accessed Aug. 4, 2003].
Epinions.com, Rating Reviews on Epinions.com (2 pages), Copyright 1993-2003, Epinions, Inc. http://www.epinions.com/help/faq/show_~faq-rating [Accessed Aug. 4, 2003].
Epinions.com, The Web of Trust (4 pages), Copyright 1993-2003, Epinions, Inc. http://www.epinions.com/help/faq/?show=faq_wot [Accessed Aug. 4, 2003].
Epinions.com, test-Earnings on Epinions.com (4 pages), Copyright 1993-2003, Epinions, Inc. http://www.epinions.com/help/faq/?show_~faq_earnings [Accessed Aug. 4, 2003].
Epinions.com, Category Lead, Top Reviewer and Advisor FAQ (12 pages), Copyright 1993-2003, Epinions, Inc. http://www.epinions.com/help/faq/show_~faq_recognition [Accessed Aug. 4, 2003].
Epinions.com, Advisor Role Transition Q&A (4 pages), Copyright 1993-2003, Epinions, Inc. http://www.epinions.com/help/faq/show_~faq_transition [Accessed Aug. 4, 2003].
Amazon.com, Frequently Asked Questions About Reviewers (3 pages) http://www.amazon.com/exec/obidos/subst/community/reviewers-faq.html/ref+cm_tr_trl_faq/104-1986906-044793 [Accessed Jul. 31, 2003].
Amazon.com, Rank Reviewer (4 pages) http://www.amazon.com/exec/obidos/tg/cm/top-reviewers-list/-/1/ref=cm-_tr_trl_faq/104-1986906-0447936 [Accessed 8/403].
Resnick, P., et al., "Reputation Systems," Communications of the ACM, Dec. 2000, 43(12), pp. 45-48.
Cranor, "Internet Privacy" Communications of the ACM 42(2): 29-31, Feb. 1999, 3 pages.
Friedman et al., "The Social Cost of Cheap Pseudonyms" Ann Arbor, MI, Aug. 17, 2000, 32 pages.
Callaham M., et al., "Reliability of Editors' Subjective Quality Ratings of Peer Reviews of Manuscripts," JAMA 280(3):229-231, 1998, 3 pages.
O'Donovan J., et al., "Personalizing Trust in Online Auctions," IOS Press, 2003, 12 pages.
Gibson, D., "Communities and Reputation on the Web," University of California, Dissertation, Fall 2002, 115 pages.
Josang A., et al., "A Survey of Trust and Reputation Systems for Online Service Provision," Decision Support Systems. 43(2), 2007, 44 pages.
Jurca R., et al., "An Incentive Compatible Reputation Mechanism," Proceedings of the IEEE Conference on E-Commerce, 2003, 8 pages.
Kamvar S., et al., "The EigenTrust Algorithm for Reputation Management in P2P Networks," WWW2003:640-651, Budapest, Hungary, May 20-24, 2003, 12 pages.
Malaga, R., "Web-Based Reputation Management Systems: Problems and Suggested Solutions," Electronic Commerce Research, 1(4), Oct. 2001, 15 pages.
Mui, L., et al., "Evaluating Reputation in Multi-agents System," AAMAS 2002 Ws Trust, Reputation LNAI 2631:123-137, 2003, 15 pages.

(56) References Cited

OTHER PUBLICATIONS

Riggs, T., et al., "An Algorithm for Automated Rating of Reviewers," JCDL '01:381-387, Roanoke, Virginia, USA, Jun. 24-28, 2001, 7 pages.

Yu B., et al., "A Social Mechanism of Reputation Management in Electronic Communities," Proceedings of Fourth International Workshop on Cooperative Information Agents, 2000, 12 pages.

Zacharia, G., et al., "Collaborative Reputation Mechanisms in Electronic Marketplaces," Proceedings of the 32$^{nd}$ Hawaiian International Conference on System Sciences, 1999, 7 pages.

Zacharia, G., "Trust Management through Reputation Mechanisms," Applied Artificial Intelligence, vol. 14, 2000, 4 pages.

Bellare, M., et al., "Security Proofs for Identity-Based Identification and Signature Schemes," May 2004, retrieved Oct. 12, 2004, from http://eprint.iacr.org/2004/252.pdf, 53 pages.

Boyen, X., "Multipurpose Identity-Based Signcryption A Swiss Army Knife for Identity-Based Cryptography," retrieved Oct. 12, 2004, from http://eprint.iacr.org/2003/163.pdf, 34 pages.

Kollock, P., "The Production of Trust in Online Markets," 1999, retrieved on Nov. 10, 2004, from http://www.sscnet.ucla.edu/soc/faculty/kollock/papers/online_trust.htm, 18 pages.

Lynn, R., "Keeping Online Daters Honest," Apr. 1, 2005, retrieved on Apr. 4, 2005 from http://www.wired.com/news/print/0,1294,67083,00.html, 3 pages.

Donath, J., "Identity and Deception in the Virtual Community," retrieved Nov. 10, 2004, from http://smg.media.mit.edu/people/Judith/Identity/IdentityDeception.html, 26 pages.

Wang, G., et al., "Remarks on Saeednia's Identity-Based Society Oriented Signature Scheme with Anonymous Signers," retrieved on Oct. 12, 2004, from http://eprint.iacr.org/2003/046.pdf, 6 pages.

Payment-On-Line (AOL, Compuserve, INTERNET, etc), Oct. 20, 1994, retrieved Dec. 6, 2004, from http://groups-beta.google.com/group/misc.entrepreneurs/browse_thread/thread/80fcf110252bb3f7/ff1c8, 3 pages.

"Frequently Asked Questions," retrieved Apr. 4, 2005, from http://www.truedater.com/index.php?action=faqs, 2 pages.

"Identity Deception," Feb. 15, 2000, retrieved Nov. 10, 2004, from http://xenia.media.mit.edu/~spiegel/classes/VirtualSociety2000/Deception.html, 2 pages.

"Web of Trust," retrieved Nov. 10, 2004, from http://www.thawte.com/wot/, 1 page.

"FAQ's—The Web of Trust," retrieved on Nov. 10, 2004, from http://www.epinions.com/help/faq/?show=faq_wot, pp. 4 pages.

"Explanation of the Web of Trust of PGP," Feb. 2004, retrieved Nov. 10, 2004, from http://www.rubin.ch/pgp/weboftrust.en.html, 3 pages.

Ottaway et al., "The Impact of Auction Item Image and Buyer/Seller Feedback Rating on Electronic Auctions," Journal of Computer Information Systems, Spring 2003, 43(3), 5 pages.

BizRate.com Web Pages, BizRate.com, retrieved from Archive.org on Apr. 8, 2005, 15 pages.

Deja.com Web Pages, Deja.com, retrieved from Archive.org on Apr. 8 and 11, 2005, 50 pages.

"Deja News Changes Name to Deja.com, IntroducesRatings," retrieved from URL=http://www.shmoo.com/mail/cypherpunks/may99/msg00139.html on Jul. 2, 2013, 2 pages.

Dellarocas, "The Digitalization of Word-of-Mouth: Promise and Challenges of Online Reputation Mechanisms," Sloan School of Management, Massachusetts Institute of Technology, Oct. 1, 2002, 38 pages.

Josang et al., "The Beta Reputation System," *15$^{th}$ Bled Electronic Commerce Conference, e-Reality: Constructing the e-Economy,* Bled, Slovenia, Jun. 17-19, 2002, 14 pages.

Kirby, "EVERYONE'S A CRITIC/Web sites hope online reviews of products lead to online buying," San Francisco Chronicle, Jan. 22, 2000, retrieved from URL=http://www.sfgate.com/business/article/Everyone-S-A-Critic-Web-sites-hope-online- . . . on Jul. 2, 2013, 4 pages.

Kuehl, "New World of Web Reviews," *Internet World* 5(34):52-54, Dec. 1, 1999.

Notess, "Web Wanderings—Consumer's Revenge: Online Product Reviews and Ratings," Apr. 2000, retrieved from URL=http://notess.com/write/archive/200004ww.html on Jul. 2, 2013, 4 pages.

Piller, "Internet awash in opinions Regular consumers posting evaluations on Web sites," Chicago Sun Times, Dec. 7, 1999, p. 36, retrieved from URL=http://proquest.umi.com/pqdweb?index=41&sid=1&srchmode=1&vinst=PROD&fmt=3&st . . . on Apr. 8, 2005, 2 pages.

\* cited by examiner

*Fig. 2*

MANAGING CONTENT BASED ON REPUTATION

TECHNICAL FIELD

The following disclosure relates generally to techniques for analyzing the content of information, and more particularly to using automatically determined reputations of users to assist in content selection and use, such as the reputations of the authors and/or evaluators of the content.

BACKGROUND

As the Internet and other online access to information continues to grow, users are increasingly presented with an over-abundance of available information content without effective means to manage it (e.g., to identify content that is relevant, accurate and enjoyable). While some systems exist that attempt to locate content of a particular type and to rank available content as to relevance, such as some search engines, the techniques used by such systems have numerous problems. For example, even if a particular technique for ranking identified content was effective, a system using such a technique would still suffer from the difficulty in initially identifying that content as being potentially relevant so that it could be ranked. Moreover, as the number of available sources of content grows (e.g., content from numerous users that generate blogs (or "Web logs") that may each have multiple distinct blurbs of content that address disparate topics each day), the ability to timely identify and analyze such content further suffers.

One particular example of an increasing source of content relates to merchants that sell items such as products, services, and data via the World Wide Web ("the Web"). It is common for such Web merchants to design their Web sites to display content in order to draw interest to items available from the Web site. As one example of such content, some Web merchants include item reviews on their Web sites, such as to provide additional information about an item. While Web merchants may in some cases pay professional reviewers to prepare item reviews, procuring such reviews can be expensive, and some readers of professional reviews may be distrustful of the evaluation from a professional reviewer.

In other cases, volunteer users of a Web site, such as customers of a merchant's Web site, are solicited to prepare item reviews. While volunteer reviews have advantages over professional reviews in terms of cost and of appeal to some readers, volunteer review programs often have significant disadvantages of their own. For example, it can often be difficult to convince volunteers to prepare item reviews. In addition, many such volunteer reviews may be of little use to other users (e.g., prospective purchasers) for a variety of reasons, such as poor writing and/or analysis, the inclusion of irrelevant and/or inappropriate subject matter, opinions that differ greatly from those of most other users, etc.

In view of the above-discussed disadvantages of identifying content of interest, a more effective approach to identifying useful item reviews and other types of content of interest would have significant utility.

BRIEF DESCRIPTION OF THE DRAWINGS

FIG. 2 is a display diagram illustrating an example of a display that shows a list of top-ranked reviewers.

DETAILED DESCRIPTION

Figure 1:
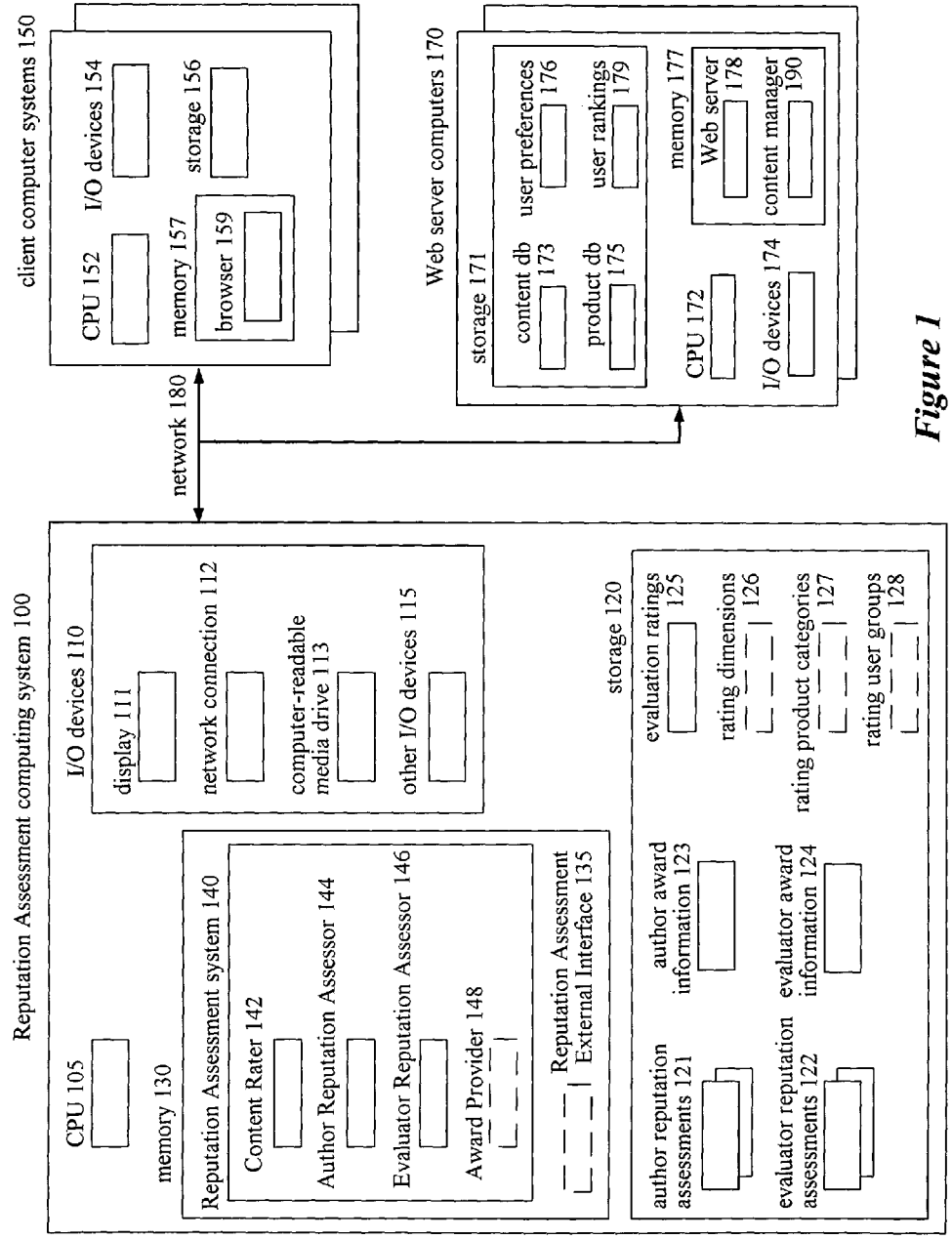
FIG. 1 is a block diagram illustrating an embodiment of a Reputation Assessment system facility.

A software facility is described below that manages a variety of types of content in order to identify content that has attributes of interest, such as content that is useful to people other than the author of the content. In particular, in some embodiments the system obtains evaluations from users of available content (e.g., votes on or other forms of rating of one or more attributes of the content) and uses them a variety of ways, including to assist in the identification of content with various attributes of interest. As illustrative examples, the content being evaluated and managed may include item reviews and/or how-to guides provided to a Web merchant by user authors, or may instead include blogs and blog blurbs (or other portions of blogs), which may be evaluated so as to select the "best" blurb from a particular blog. More generally, the content to be evaluated and managed may in some embodiments be any information that has one or more attributes that can be evaluated by other users (e.g., information that includes one or more factual assertions or opinions, with the evaluations used to certify the accuracy and/or truthfulness of those assertions).

In some embodiments, the management of the content by the facility includes automatically determining for each such content evaluator one or more reputation scores that reflect various aspects of the evaluator's reputation, and then varying the weight given to evaluations based on the reputation scores of the evaluators that provided the evaluations. Similarly, in some embodiments the facility automatically determines for each content author one or more reputation scores that reflect various aspects of the author's reputation, and then alters ratings given to content based in part on the reputation scores of the content's author. As discussed in greater detail below, such reputation scores can be calculated and used in a variety of ways, and in some embodiments are based solely on the prior activities of the authors and evaluators in authoring content and providing evaluations (thus creating a form of evaluation of the user's history), while in other embodiments additional information related to the authors and evaluators can additionally influence their reputation scores (e.g., feedback from other readers of content or content evaluations, or reputation scores and/or other information for other users related to the authors/evaluators, such as via defined buddy lists or friendship relationships). In at least some embodiments, the reputation scores are used as the basis for predicting future behavior of users as authors and/or evaluators based on their past behavior, and thus consistency in such activities may result in higher reputation scores that reflect their predictive value.

In particular, and as described in greater detail below, when content is first provided by an author, it may in some embodiments enter an initial evaluation phase in which content evaluations are solicited and received from various evaluator users, with the evaluations each including one or more quantitative ratings (e.g., a numerical value from a specified scale, or one of an enumerated set of ratings) of the content. After sufficient evaluations are received, the evaluations for the content are aggregated in order to generate one or more aggregate ratings for the content, with the aggregate rating(s) for the content then used during a post-evaluation phase when determining whether/when to display or otherwise provide or indicate the content to other users (also referred to as "surfacing" the content).

In some embodiments, the reputation scores that are automatically calculated for each of the authors and evaluators include a reputation voting weight score that affects how much influence is given to evaluations and/or other content provided by the authors and evaluators. In particular, the voting weight of an evaluator may cause content ratings in evaluations from the evaluator to effectively be counted multiple times or only a fraction of a time, thus raising or lowering the effect of the quantitative ratings provided by the evaluation. Similarly, in some embodiments the voting weight of an author will also influence how much effect a quality-based reputation rating for the author is given when calculating a content rating for content provided by the author.

In addition to and/or instead of automatically calculated reputation voting weight scores, the automatically calculated reputation scores for authors and evaluators may in some embodiments include quality-based reputation rating scores and/or reputation ranking scores that reflect both quality and quantity of content/evaluations provided by the authors and evaluators. Overall rankings of evaluators relative to each other can then be generated based on the reputation ranking scores and/or the reputation rating scores for those evaluators, and can be used to provide awards of various types to evaluators that satisfy predefined criteria (e.g., a top 10 or top 1000 evaluator). In a similar manner, overall rankings of authors relative to each other can be generated based on the reputation ranking and/or rating scores for those authors, and can be used to provide awards of various types to authors that satisfy predefined criteria.

As noted above, in some embodiments the reputation rating scores that are automatically calculated for authors and evaluators are based on the quality of content/evaluations previously provided by those authors and evaluators, while the reputation ranking scores for authors and evaluators are based on both quality and quantity of content/evaluations. For example, with respect to calculating a reputation rating score for an author, a specified number of pieces of content that were previously authored by the author and subsequently rated may be used, with the reputation rating score for the author being the average of aggregate content rating scores for those pieces of content. The reputation ranking score for the author for those (or other) pieces of content can then be calculated by, for example, aggregating (e.g., summing) the aggregate content rating scores for each of those pieces of content. Calculation of a reputation voting weight score for the author may be performed based on, for example, the consistency of the quality of the content produced by the author over those (or other) pieces of content, such as based on the aggregate ratings. Specific examples of such calculations are discussed below for illustrative purposes.

Various reputation scores can also be calculated for evaluators in a similar manner. For example, with respect to calculating a reputation rating score for an evaluator, in some embodiments a specified number of evaluations that were previously provided by the evaluator for content that was subsequently rated may be used, with the reputation rating score for the evaluator based on the average degree of agreement of the evaluator's evaluations with a consensus evaluation of that content. If consensus was not reached among the evaluators of a piece of content, as discussed in greater detail below, that content and its evaluations may in some embodiments not be used for calculating reputation scores. The reputation ranking score for an evaluator for those (or other) evaluations can be calculated by, for example, aggregating (e.g., summing) a quantitative representation of the degree of agreement with the consensus for each of those evaluations. Calculation of a reputation voting weight score for the evaluator may be performed based on, for example, the evaluator's reputation rating score over those (or other) evaluations, such as to give evaluators with the highest degree of agreement with consensus evaluations the most voting weight. Specific examples of such calculations are provided below for illustrative purposes.

When authors and/or evaluators initially begin their authoring/evaluating, they may in some embodiments receive default reputation scores, and non-default reputation scores may in some such embodiments not be calculated until a sufficient number of past content ratings (for authors) or indications of evaluation consensus agreement (for evaluators) are available. Alternatively, reputation scores for authors and/or evaluators may instead be calculated after only a limited number of prior data points are available, but with the resulting calculated reputation scores restricted in various ways to prevent undue influence to be given to only a limited number of data points (e.g., by giving the equivalent of only partial rating/ranking score credit for some number of data points for which actual data is not yet available, which has the effect of deflating and regularizing the calculated scores).

In some embodiments, various awards are also provided to authors and/or evaluators based on their reputation ranking and/or rating scores. These awards can take a variety of forms, as discussed in greater detail below, including iconic "badges" that are displayed along with indications of those authors/evaluators having top rankings to illustrate their current ranking, iconic "trophies" that are displayed along with indications of authors/evaluators to illustrate top rankings at a specified prior time, specific portions of a Web site that are provided to display information about top (or all) authors and/or evaluators (e.g., one or more Web pages devoted to that purpose, or portions of Web pages that are intended for other purposes), monetary and/or monetary equivalent compensation, special privileges and/or access at the Web site and/or elsewhere, etc. Moreover, as previously noted, in some embodiments authors and/or evaluators are granted increased voting weight based on their reputation rating and/or ranking scores, which can assist authors in having their content surfaced more often and can assist evaluators in having their evaluations of content surfaced more often with that content.

More generally, in some embodiments authors and/or evaluators can receive a variety of types of feedback regarding their reputations (e.g., as part of a reputation dashboard graphical user interface in which various reputation-related information is displayed and accessible to the user), such as current and past scores and overall rankings, trends or rates of change in such scores/rankings (e.g., relative to others), reasons for particular changes in scores/rankings, suggestions for improving scores/rankings, explanations for how aggregate ratings were calculated for a specified piece of content, explanations for how consensus-related information for the evaluations of a piece of content was calculated, etc.—such feedback can in some situations provide significant incentives to authors/evaluators to perform more content submissions and content evaluations.

In addition to providing voting weight to authors and/or evaluators on the basis of factors such as their reputation voting weight scores, in some embodiments factors other than reputation can also affect the voting weight given to a user, whether in addition to or instead of reputation-based weights. For example, in some embodiments a sales-based weighting mechanism is used to provide voting weight to users based on prior sales to those users, such that an evaluation of an item by an evaluator that had previously generated significant sales of related (or any) items would be given greater weight than an evaluation by an evaluator without such prior sales. A variety of other weighting mechanisms can similarly be used in various embodiments.

In some embodiments, various thresholds may also be employed to determine when to use various types of information in reputation-related or other calculations. For example, a content rating threshold may be used to determine when sufficient evaluations of a piece of content have occurred in order to generate an aggregate rating for the content. Such a content rating threshold may be based on, for example, a quantity of evaluations received and/or an amount of time elapsed for obtaining evaluations. In addition, in some embodiments the reputation voting weight scores of authors and/or evaluators can also be used in determining when a sufficient quantity of evaluations have been received, such as by using a content rating threshold that is based on a quantity of weighted evaluation points. Similarly, one or more author reputation calculation thresholds may be used to determine whether a rated piece of content should be used in the calculation of the reputation rating and/or ranking scores for the author that authored the content, and/or one or more evaluator reputation calculation thresholds may be used to determine whether a rated piece of content that was evaluated by the evaluator should be used in the calculation of the reputation rating and/or ranking scores for the evaluator.

In addition, in some embodiments a piece of content may receive multiple quantitative ratings from each evaluator, such as one for each of multiple rating dimensions for that content, with such content rating dimensions each related to one or more attributes (or aspects or qualities or properties) of the content (e.g., usefulness, accuracy, informativeness, inappropriateness, humorousness, etc.). Such rating dimensions may in some embodiments be predefined, such as by an operator of a Web site providing the reputation calculations, or may instead in other embodiments be dynamically defined by one or more of the evaluators of the content. In addition, different pieces of content may have different rating dimensions in some situations, such as based on the type of content. When ratings are received for multiple rating dimensions of a piece of content, that content may in some embodiments receive aggregate ratings for each of the rating dimensions and/or may receive an overall aggregate rating for the content (e.g., based on a weighted aggregation of the ratings for the various rating dimensions, such as to allow some rating dimensions to have greater weight than others).

Moreover, in some embodiments a piece of content may also be given multiple different aggregate ratings for use with different groups of readers (with the term "reader" used generally herein to refer to any user that perceives any form of content, whether or not it is textual information that is perceived visually) and/or different purposes, such as if one group of users is likely to rate the content differently than other groups (e.g., a user group defined based on demographic information such as age, gender or location). In some such embodiments, such ratings are generated by separating the evaluations for the content before the generating of the aggregate ratings, with the separating performed to create groups of evaluations that correspond to each of the different rating types (e.g., so that evaluators in a demographic group are the ones whose evaluations are used to produce content ratings to be used for other users in that group). Similarly, authors and/or evaluators may in some embodiments receive multiple sets of reputation scores, such as with each set specific to different types of content and/or for different purposes (e.g., so that an evaluator with specific knowledge or expertise regarding one type or category of item may receive different reputation scores for evaluations of those types of items than for other types of items for which the evaluator does not have such knowledge or expertise). In addition, a user may receive different reputation scores for the user's activities as an author and as an evaluator. Other types of activities by a user could similarly be evaluated and result in additional sets of reputation scores for the user.

As noted above, in some embodiments the techniques provided by the facility are used by Web merchants to enhance the usefulness of product reviews and other item reviews for items available from their Web sites that are selected to be provided to potential buyers of such items. In other embodiments, the techniques provided by the facility can be used in other ways, such as by an operator of the facility providing the facility's techniques to external third-parties (e.g., as a Web service to customers for a fee). In addition, in some embodiments various of the information generated by the facility (e.g., calculated reputation scores for authors and/or evaluators) and/or other types of reputation-related data (e.g., data available for use by the facility in calculating reputation scores, such as evaluations provided by evaluators) can be provided to external third parties, such as to allow a user to export their reputation to Web sites of others in order to receive benefits from those others that are commensurate with their reputations, or to allow the other Web site to better customize their Web site to various visitors. Similarly, in some embodiments reputation-related information could be received from one or more third parties (e.g., reputation scores for authors and/or evaluators that were calculated by the third parties, or instead other types reputation-related data available from the third parties, such as data that can be used by the facility when calculating reputation scores), and then used by the facility in assessing the reputation of authors and/or evaluators (or other types of users). Such exchange of reputation-related information to and/or from the facility may in some embodiments be performed for a fee or other compensation, whether to the facility from the third party or instead from the facility to the third party.

For illustrative purposes, some embodiments of the software facility are described below in which item reviews at a Web merchant are the content provided by reviewer users and in which evaluations of the item reviews are provided by other users of the Web merchant system. In addition, a variety of details are discussed below regarding specific techniques for calculating specific types of reputation scores for authors and evaluators, and for using them in specific ways to provide benefits to authors, evaluators, and readers of content. However, those skilled in the art will appreciate that the invention is not limited to use with Web merchant systems or which the specific calculation techniques, and that the techniques of the invention can be used in a wide variety of other situations, such as to determine and track reputations of other types of individuals and/or companies (e.g., suppliers, manufacturers, partners, vendors, affiliates, employees, customers, etc.) that provide information or otherwise perform interactions or activities that can be evaluated.

In addition, additional details related to soliciting and processing item reviews and evaluation votes are included in co-pending U.S. patent application Ser. No. 09/842,265, filed Apr. 24, 2001 and entitled "Creating An Incentive To Author Useful Item Reviews," which is hereby incorporated by reference in its entirety.

As an illustrative example, FIG. 1 illustrates a computing system 100 suitable for executing an embodiment of the Reputation Assessment ("RA") system facility 140, as well as Web server computing systems 170 that can use reputation-based information when selecting content to provide to users of client computer systems 150. The Reputation Assessment computing system 100 includes a CPU 105, various I/O devices 110, storage 120, and memory 130, with the I/O devices illustrated in this example embodiment including a display 111, a network connection 112, a computer-readable media drive 113, and various other I/O devices 115.

The embodiment of the RA system 140 is executing in memory 140, and it includes a Content Rater component 142, an Author Reputation Assessor component 144, an Evaluator Reputation Assessor component 146, and an optional Award Provider component 148. The Content Rater component generates ratings for content based on evaluations from evaluators, while the Author and Evaluator Reputation Assessor components generate reputations assessments (e.g., scores) for authors based on content that they author and for evaluators based on evaluations that they provide, respectively. In some embodiments, the Award Provider component will also be used to provide a variety of types of awards to authors and/or evaluators based on their generated reputation assessments.

In particular, the Content Rater component first receives content to be rated, such as from a content manager system 190 executing in memory 177 of a Web server computer, or instead directly from a user of a client computer system, or by automatically identifying the content as being of potential interest (e.g., by searching portions of the Internet or other information source). The Content Rater component then receives multiple content evaluations from evaluators for the content, which in the illustrated embodiment are stored as evaluation ratings 125 on storage 120—in other embodiments, such evaluations may instead be treated as independent pieces of content that are stored along with other content in a content database 173 on storage 171 of a Web server computer 170 (e.g., to enable management of them by a content manager system 190), or the evaluations for a piece of content may instead be stored together with the content that they evaluate or in a manner otherwise associated with that content. The content evaluations can also be received in various ways, such as by the Content Rater component interacting with the content manager system 190 and/or the Web server 178 of a Web server computer in order to present the content to potential evaluators and to solicit them to provide evaluations.

After the Content Rater component determines that sufficient evaluations have been received for a piece of content, such as by those evaluations satisfying a predefined content rating threshold (not shown), the component generates one or more aggregate ratings for the content, which in the illustrated embodiment are then provided to the content manager system to be stored in a manner associated with the content in the content database. In other embodiments, the content ratings could instead be stored by the RA system and provided to others upon request, or the RA system could instead dynamically calculate the aggregate rating(s) for a piece of content upon request based on whatever evaluations and other related information is available at the time of the request. In some embodiments, the Content Rater component may also optionally use other information when obtaining evaluations and calculating aggregate ratings, such as rating dimensions 126 that specify one or more dimensions for which a piece of content (or content of a specified type) can or must be rated as part of an evaluation, and rating user groups 128 that specify groups or types of users for which independent groups of evaluations will be gathered and/or for which independent aggregate content ratings will be maintained (e.g., based on the independent groups of evaluations).

After one or more pieces of content have been rated by the Content Rater component, the Author Reputation Assessor component and/or the Evaluator Reputation Assessment component may generate or update one or more reputation scores or other reputation assessments for authors of that content or for evaluators of that component, respectively, such as based on the evaluations for that content. In particular, in the illustrated embodiment the Evaluator Reputation Assessment component first determines whether the evaluations for that content satisfy a predefined evaluator reputation assessment threshold (not shown), such as by the evaluations reflecting a specified degree of consensus (e.g., as determined by a separate consensus determination component, not shown). If so, the Evaluator Reputation Assessment component generates one or more reputation assessments for one or more of the evaluators that provided those evaluations, whether as initial assessments for those evaluators or instead as updates to previous assessments, and stores those assessments with evaluator reputation assessments 122 on storage. In other embodiments, the evaluator reputation assessments may instead be dynamically calculated upon request based on information available at the time of the request. In some embodiments, the evaluator reputation assessments for an evaluator include an evaluator reputation rating score that is based on the quality of the evaluator's evaluations (e.g., measured with respect to their degree of agreement with other evaluators' evaluations), an evaluator reputation ranking score that is based on both the quality and quantity of the evaluator's evaluations, and an evaluator voting weight score to reflect how much weight evaluations from that evaluator are to receive.

In a similar manner to the Evaluator Reputation Assessment component, the Author Reputation Assessment component determines whether the rated content and/or its evaluations satisfy a predefined author reputation assessment threshold (not shown), such as by the evaluations having a specified degree of consensus. If so, the Author Reputation Assessment component generates one or more reputation assessments for the author(s) that authored that content, whether as initial assessments or instead as updates to previous assessments, and stores those assessments with the author reputation assessments 121 on storage. In other embodiments, the author reputation assessments may instead be dynamically calculated upon request based on information available at the time of the request. In some embodiments, the author reputation assessments for an author include an author reputation rating score that is based on the quality of the author's content (e.g., measured with respect to the author's consistency in the ratings of his/her prior content), an author reputation ranking score that is based on both the quality and quantity of the author's content, and an author voting weight score to reflect how much weight the author's rating will be given when rating future pieces of content from the author.

In some embodiments, the Author Reputation Assessor component and/or the Evaluator Reputation Assessment component may also perform additional actions, such as generating overall rankings for authors or evaluators relative to other authors or evaluators, respectively (e.g., based on the relative generated reputation assessments), or such rankings could instead be generated by a separate ranking component (not shown). Such rankings can then be stored as user rankings 179 on storage 171 of a Web server computer to allow the Web server to provide various information and/or functionality based on such rankings. In addition, any of the components 142-146 may also in some embodiments use additional information to further adjust aggregate ratings and/or reputation assessments that are calculated, such as to reflect sales weights (not shown) for users based on amounts of prior relevant sales. Moreover, the Author Reputation Assessor component and/or the Evaluator Reputation Assessment component may also use other information when calculating reputation scores or other reputation assessments for authors and evaluators, such as optional rating product categories 127 on storage. Such product categories allow the reputation assessments that are generated for authors and/or evaluators to be separated into different groups, such as to allow different reputation assessments for content corresponding to different rating product categories. In other embodiments, other manners of differentiating types of content (e.g., based on the source of the content, topics of the content, etc.) could instead be used for differentiating multiple sets of reputation assessments for some or all of the authors and/or evaluators.

The Award Provider component then uses the generated reputation assessments for authors and/or evaluators to determine various types of awards to be provided, such as for highly rated and/or highly ranked authors and/or evaluators, and may in some embodiments interact with those authors and/or evaluators to notify them of awards to be provided to them or to otherwise provide such awards. In addition, the Award Provider content may interact with the content management system in some embodiments so that indications of awards can be displayed or otherwise presented to users, such as badges and/or trophies for top authors and/or evaluators. In the illustrated embodiment, the Award Provider component stores indications of the author award information 123 and evaluator award information 124 on storage 120, although in other embodiments such information could instead be provided directly to the content management system and/or Web server for storage.

After the RA system has generated content ratings for content, the content manager system can then use those ratings in selecting content to provide to users, such as to select product review content to accompany other information about a product from a product database 175 that is provided to prospective purchasers. The providing of the content to the user may be performed in conjunction with a Web server that is responding to requests from users of client devices with Web browsers, and may also in some embodiments be performed in conjunction with various predefined user preferences 176 for those users. In addition, when reputation assessments, author and/or evaluator rankings, and author and/or evaluator award information is available from the RA system, the content manager system and/or the Web browser may also incorporate such information when providing content to users, such as to include indications of author/evaluator awards and/or rankings (e.g., to all users), as well as indications of author and/or evaluator reputation assessments (e.g., by providing high-level or statistical summary information to all users, but providing details about the reputation assessments only to the authors/evaluators to which they apply).

In addition, while in some embodiments the RA system is operated as part of a organization with one or more Web servers in order to support the one or more Web sites provided by those Web servers for the organization, in other embodiments the RA system may also or instead interact with various external third-party computer systems, such as to provide reputation-based functionality to them as a service (e.g., as a Web service) and/or to exchange generated reputation score information with them. If so, the RA system may interact with one or more optional Reputation Assessment External Interface systems 135 to facilitate the communication with third-party computing systems, with the systems 135 executing in memory 140 of the computing system 100 in this illustrated embodiment.

Moreover, users can access the RA system in a variety of ways in various embodiments. For example, some users (e.g., system developers and maintainers) may have physical access to the computing system 170, while other users can use client computer systems to remotely access the RA system (e.g., via the Internet and/or the World Wide Web). In embodiments in which end-users can interact directly with the RA system (e.g., to obtain reputation assessments), such users may use software or other functionality provided on the client computer systems, such as a browser 159 executing in memory 157, to interact with the RA system. In addition, some or all of the RA system components may provide various feedback or other general types of information to users (e.g., in response to user requests), and this information can be presented to a local user on the display 111 of the computing system 100 or instead on one of the I/O devices 154 on a remote client system.

Those skilled in the art will appreciate that computing systems 100, 150 and 170 are merely illustrative and are not intended to limit the scope of the present invention. Computing system 100 may be connected to other devices that are not illustrated, including through one or more networks such as the Internet or via the World Wide Web (WWW). In addition, the functionality provided by the illustrated RA system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the RA system components or data structures may also be stored (e.g., as instructions or structured data) on a computer-readable medium, such as a hard disk, a memory, a network, or a portable article to be read by an appropriate drive. The RA system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

FIGS. 2-5 show examples of ways in which information about top-ranked reviewers can be provided to users of a Website, with analogous information about evaluators similarly able to be provided (although not shown here for the sake of brevity).

Figure 2:
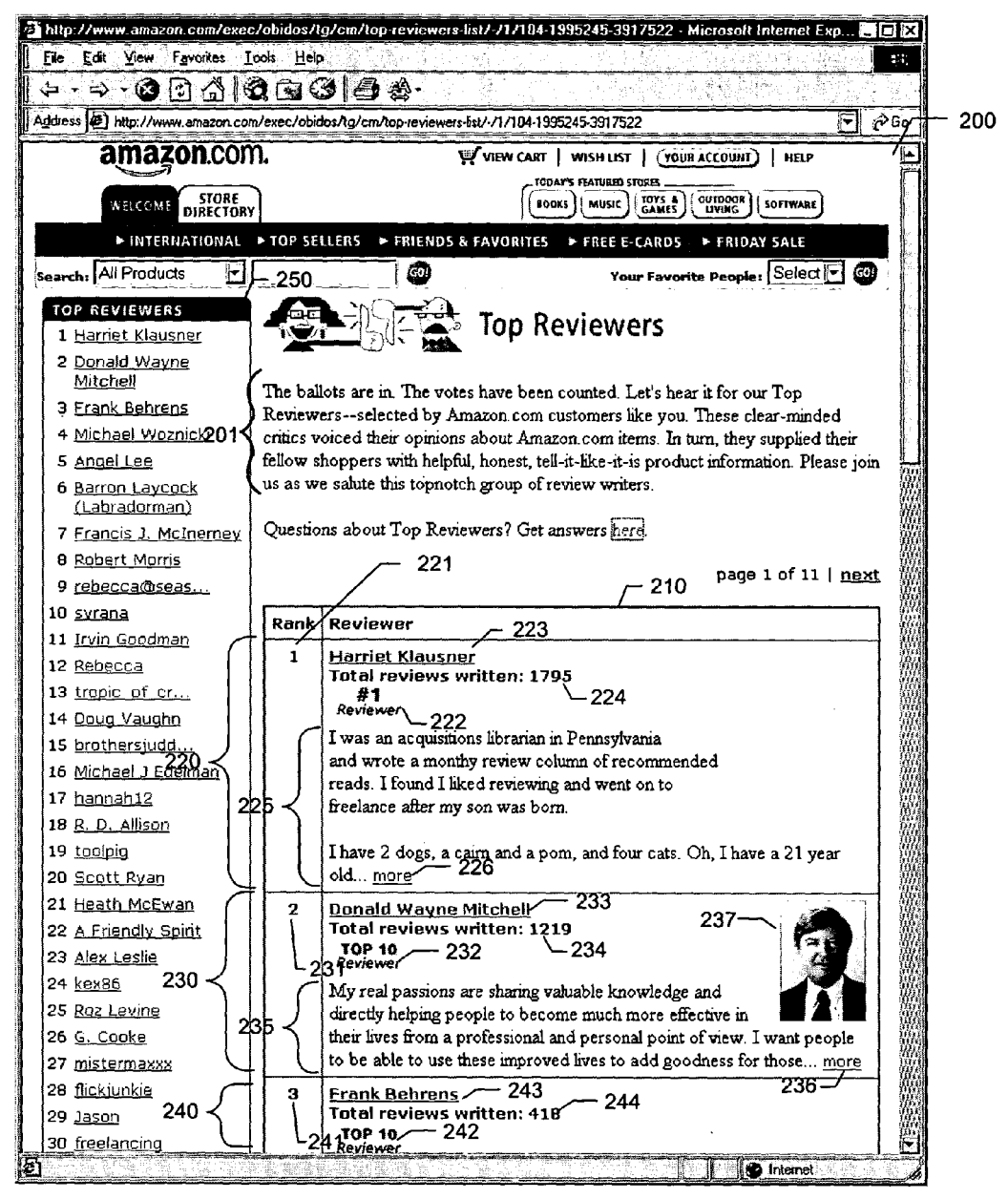

In particular, FIG. 2 is a display diagram illustrating an example of a display 200 that shows a list of top-ranked reviewers. This example display is displayed as part of the Web site of Web merchant Amazon.com, and includes language 201 congratulating the top-ranked reviewers and an ordered list 210 of the top-ranked reviewers. List 210 is comprised of ordered entries, each corresponding to one top-ranked reviewer, such as entries 220, 230, and 240. As an example, entry 220 contains information about the highest-ranked reviewer, Harriet Klausner. This entry contains the reviewer's rank 221, as well as a graphical badge 222 indicating the rank. The entry further contains the name of the reviewer 223, which is a link that the user can select in order to view more detailed information about this reviewer, as well as an indication 224 of the total number of reviews authored by this reviewer. The entry also contains further information 225 about the reviewer, which is typically provided by the reviewer. The information in this example includes a link 226 that may be selected by the user to display additional information about the reviewer. Some entries also contain an image of the reviewer, such as image 237 shown in entry 230.

In addition to the list 210 of detailed entries about the top-ranked reviewers, the display also contains a more abbreviated list 250 of the top-ranked reviewers. In this list, each entry is merely the rank value and the name of the reviewer, which is a link that may be selected by the user to display additional information about the reviewer. Such information about top-ranked reviewers, and analogous information about top-ranked evaluators, can similarly be provided in a variety of other ways.

Figure 3:
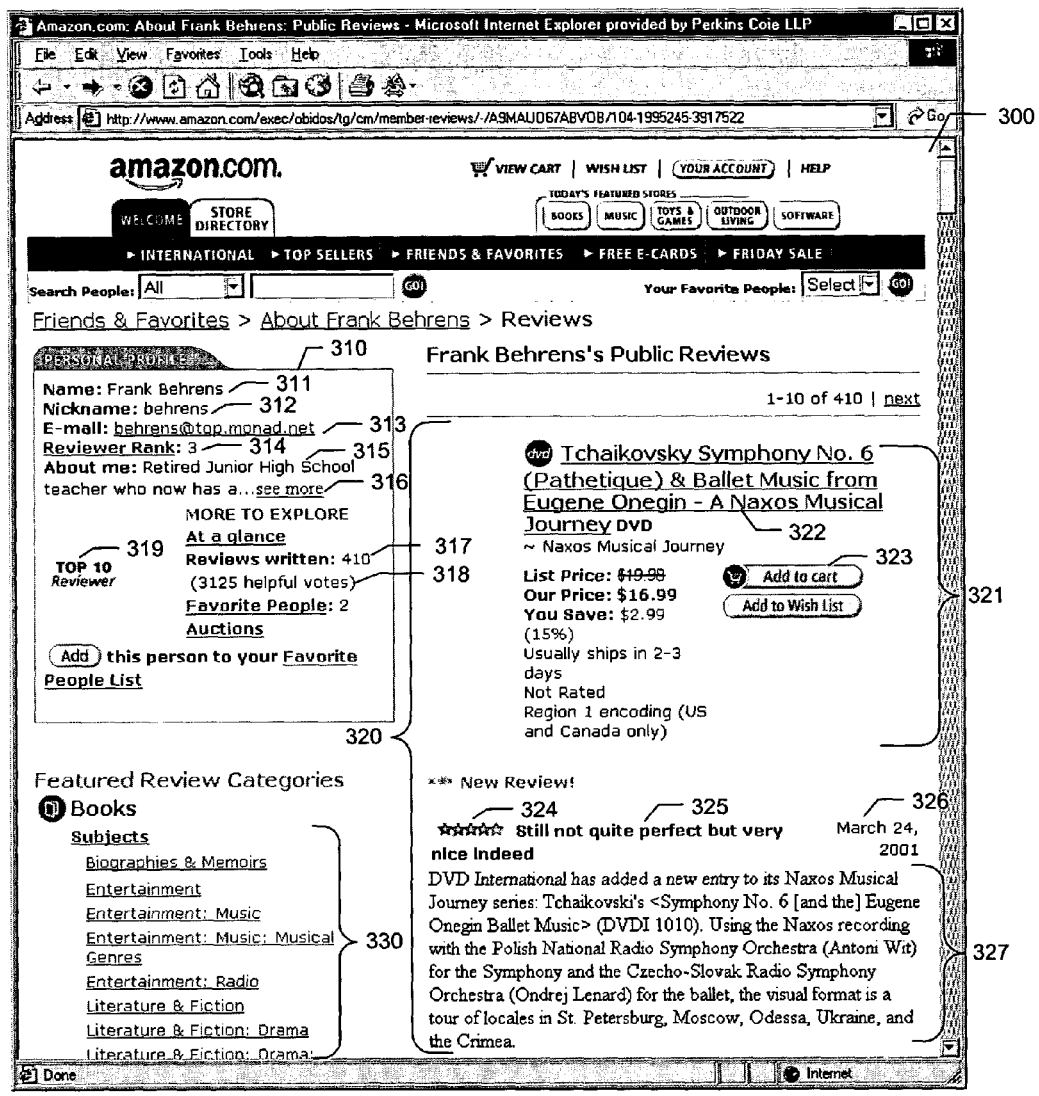
FIG. 3 is a display diagram illustrating an example of a display that provides more detailed information about a particular top-ranked reviewer.

FIG. 3 is a display diagram illustrating an example of a display that provides more detailed information about a particular top-ranked reviewer, with analogous information about a particular top-ranked evaluator similarly able to be provided (although not shown here for the sake of brevity). In particular, the example display 300 shown in FIG. 3 is provided when a user selects link 243 for the reviewer Frank Behrens shown in FIG. 2. In this illustrated embodiment, the display includes a profile 310 for the reviewer, which includes such information as the reviewer's name 311, a nickname 312 for the reviewer, an email address 313 for the reviewer, the current rank 314 of the reviewer, the beginning of a biographical sketch 315 of the reviewer, a link 316 to the entire biographical sketch of the reviewer, a count 317 of the number of reviews submitted by this reviewer, a count 318 of one type of reputation ranking assessment for the reviewer (in this case, the number of positive rating votes cast for the reviews of this reviewer by evaluators), and a graphical badge indication 319 related to the rank of the reviewer—in other embodiments, some or all of this information may instead be presented in other formats or instead not be available. The illustrated display further contains information about reviews submitted by the reviewer, including a section 330 that illustrates item categories for which the reviewer has submitted reviews. As an example of other information related to content authored by the reviewer, the display contains information 320 about a review by the reviewer, which includes information 321 about the reviewed item (e.g., the title, artist, format, price, and availability of the item), as well as a link 322 that may be used to display more information about the item and a control 323 that may be used to initiate the placement of an order for the item. The information 320 also includes a grade 324 assigned by the reviewer to the item as part of the review—here the grade shown is four stars out of five stars, and the review's title 325, date on which the review was submitted 326; and text of the review 327 also displayed.

Figure 4:
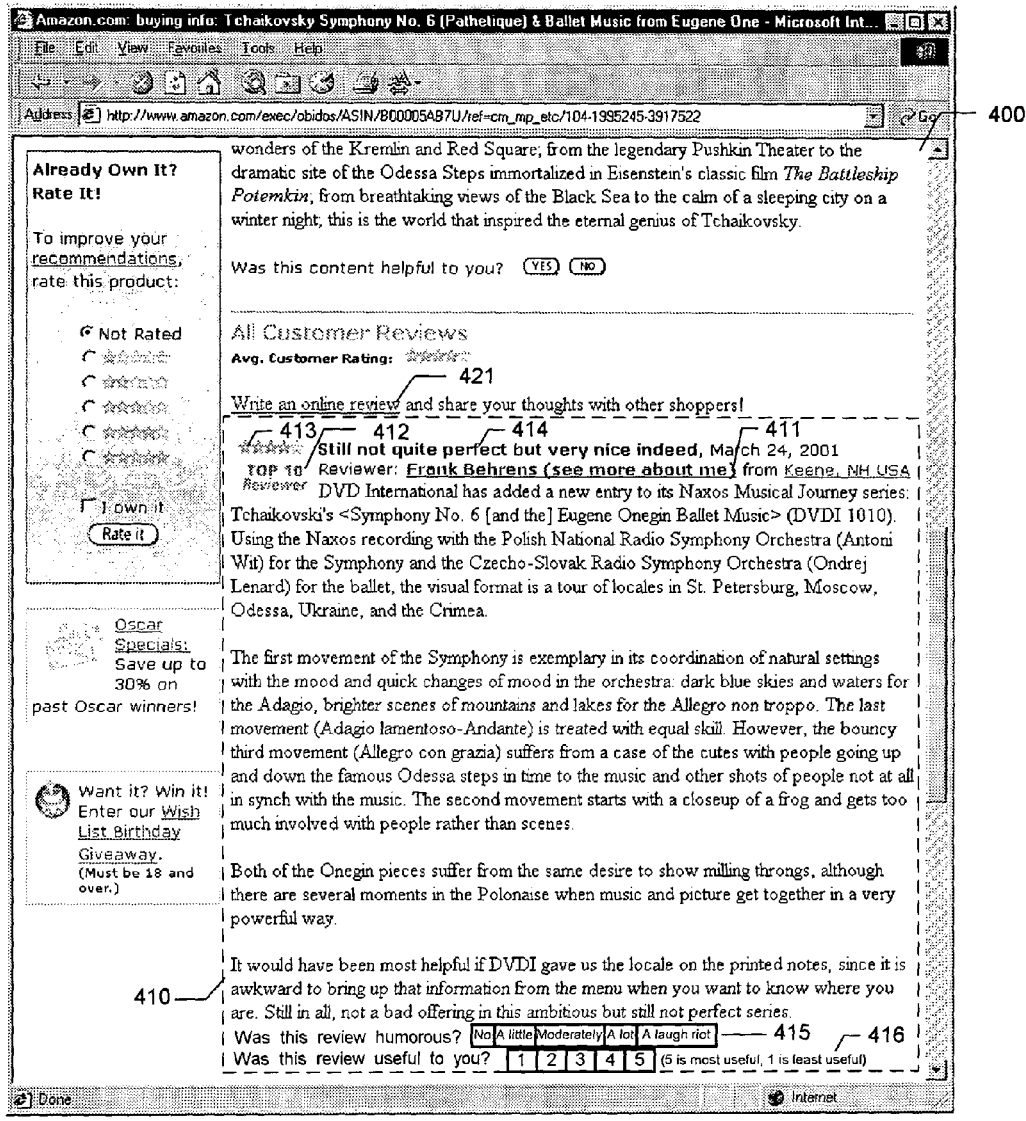
FIG. 4 is a display diagram illustrating an example of a display that provides detailed information about an available item along with item review content regarding the item.

FIG. 4 is a display diagram illustrating an example of a display that provides detailed information about an available item along with item review content regarding the item. In this example, the item is the Tchaikosvky Symphony No. 6 DVD whose review is shown in FIG. 3. The display 400 is displayed in this example in response to the selection of link 322 shown in FIG. 3. In addition to other information about the item, the display includes a list of one or more item review pieces of content submitted for the item by review authors, including review 410 submitted by reviewer Frank Behrens. The review 410 includes the reviewer's name 411, which is a link to the display shown in FIG. 3; a graphical badge 412 related to the current rank of the reviewer; the item grade 413 assigned to the item as part of the review; the review title 414; and the text of the review. In addition, in embodiments in which this display is provided to a user other than Frank Behrens that has not yet evaluated the Behrens review of the item, the display may include review evaluation rating selections to allow the user to act as an evaluator and provide an evaluation for the review. In this example, two evaluation rating selections 415 and 416 are displayed to allow the user to specify a quantitative rating of the content for each of two rating dimensions, which in the illustrated example are humor and usefulness. Other rating dimensions may instead be rated in a binary manner (e.g., via "yes" and "no" votes), in a non-quantitative manner (e.g., by gathering textual comments about the review), in a manner relative to other evaluations (e.g., this is the most informative of all the current evaluations for this content, or of all the evaluations by this evaluator, or of all the evaluations for any content, etc.). The display further includes a link 421 that solicits the user to author his or her own review of the Tchaikosvky Symphony No. 6 DVD item, such as when the user has not yet provided a review for the item.

Figure 5:
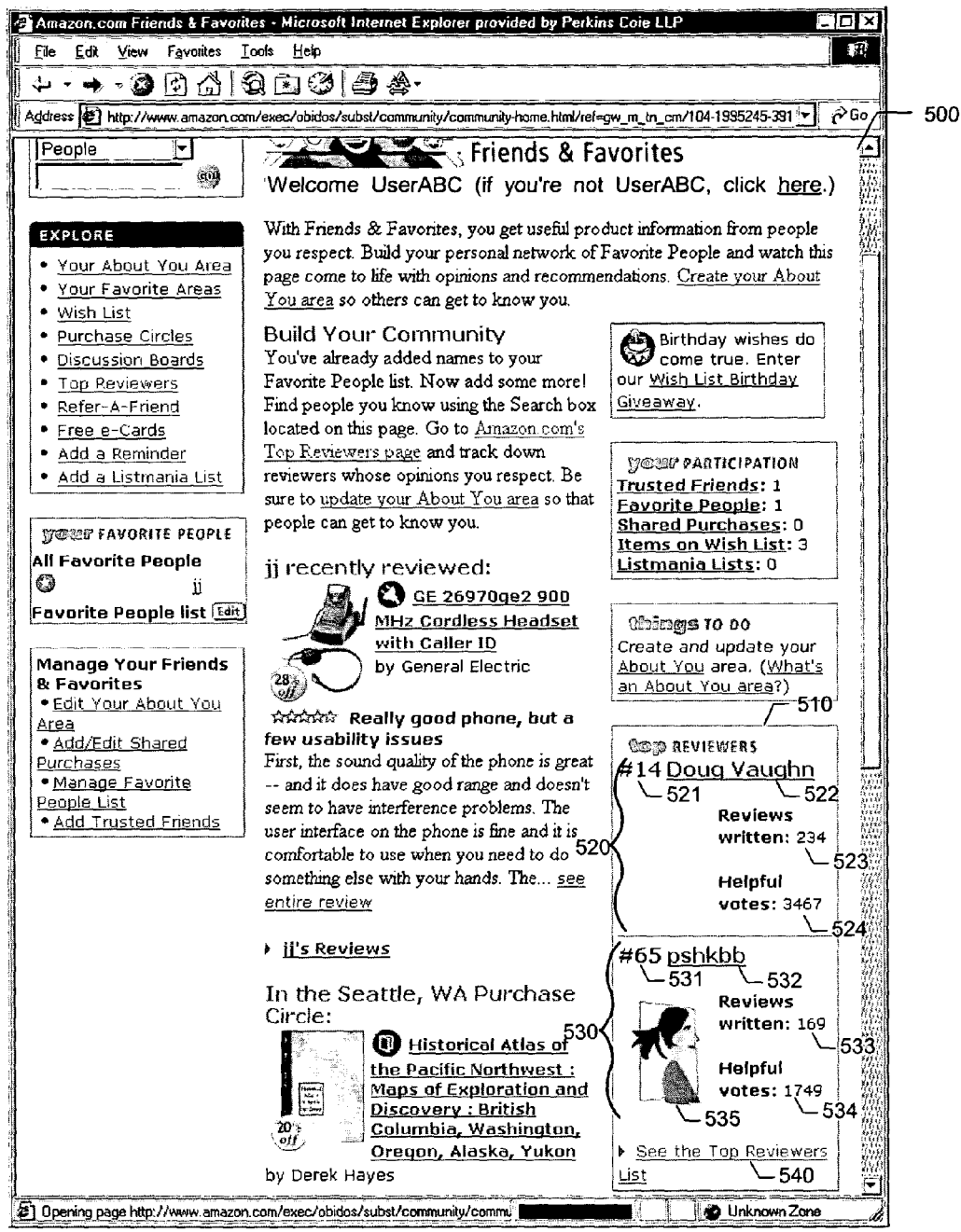
FIG. 5 is a display diagram illustrating an example of a display that provides information about two randomly-selected top-ranked reviewers.

FIG. 5 is a display diagram illustrating an example of a display that provides information about two randomly-selected top-ranked reviewers as part of a portion of a Web page related to other types of information, with analogous information about top-ranked evaluators similarly able to be provided (although not shown here for the sake of brevity). The display 500 includes a list 510 of randomly-selected top-ranking reviewers, which can be comprised of one or more entries, and in this illustrated embodiment includes entries 520 and 530 relate to two randomly-selected top-ranked reviewers. For example, entry 520 relates to reviewer number 14, and includes the reviewer's rank value 521; the reviewer's name 522, which is a link which that the user may select in order to display more information about this reviewer; the number of reviews submitted by this reviewer 523; and an indication of an author reputation ranking score for the review 524 (in this case, the number of positive votes received by this reviewer's reviews for a primary rating dimension). Some entries also contain an image of the corresponding reviewer, such as image 535 in entry 530. The display also includes a link 540 to the top reviewer's list shown in FIG. 2.

Figure 6:
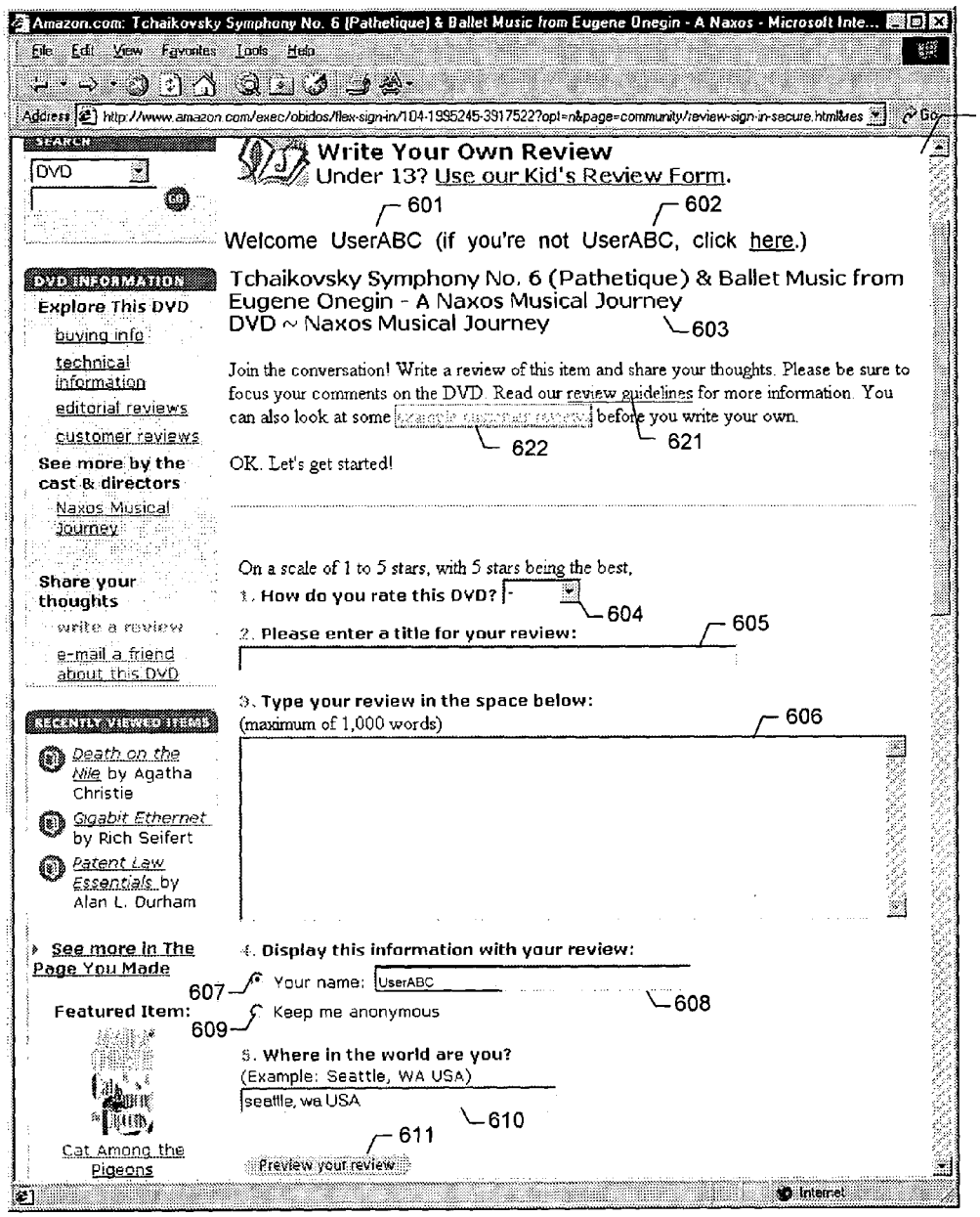
FIG. 6 is a display diagram illustrating an example of a display that enables an author to submit a new review.

FIG. 6 is a display diagram illustrating an example of a display that enables an author to submit a new review, with analogous information to allow evaluators to submit evaluations similarly able to be provided (although not shown here for the sake of brevity). The user typically receives this display in conjunction with a particular item, for which the user can submit a review, although in other situations users could submit information not specific to an item (e.g., a blurb for a personal blog of the user). In this example, display 600 is provided in response to the user's selection of link 421 in the display containing detailed information about the Tchaikovsky Symphony No. 6 DVD shown in FIG. 4. The display includes the identity of the user, which is attributed as the identity of the reviewer. To attribute a different identity to the reviewer, the user can select link 602. The display also includes information 603 identifying the item to be reviewed, including a control 604 used by the user to specify a grade or rating for the reviewed item, a field 605 for entering a title for the review, and a field 606 for entering the text of the review. The user may select radio button 607 in order to display a reviewer name with the review, which may be edited in field 608. Alternatively, the user may select radio button 609 to make the review anonymous (which in some embodiments may cause any rating of the review to not affect the author's reputation, while in other embodiments will not affect such use of ratings of the review). The display also includes field 610 for entering the author's location. Before preparing the review as described, the user may also select link 621 in order to display guidelines for preparing the review and/or may select link 622 in order to display one or more example customer reviews demonstrating compliance with the review guidelines. When the user has assembled the review to be submitted, the user selects button 611.

Figure 7A:
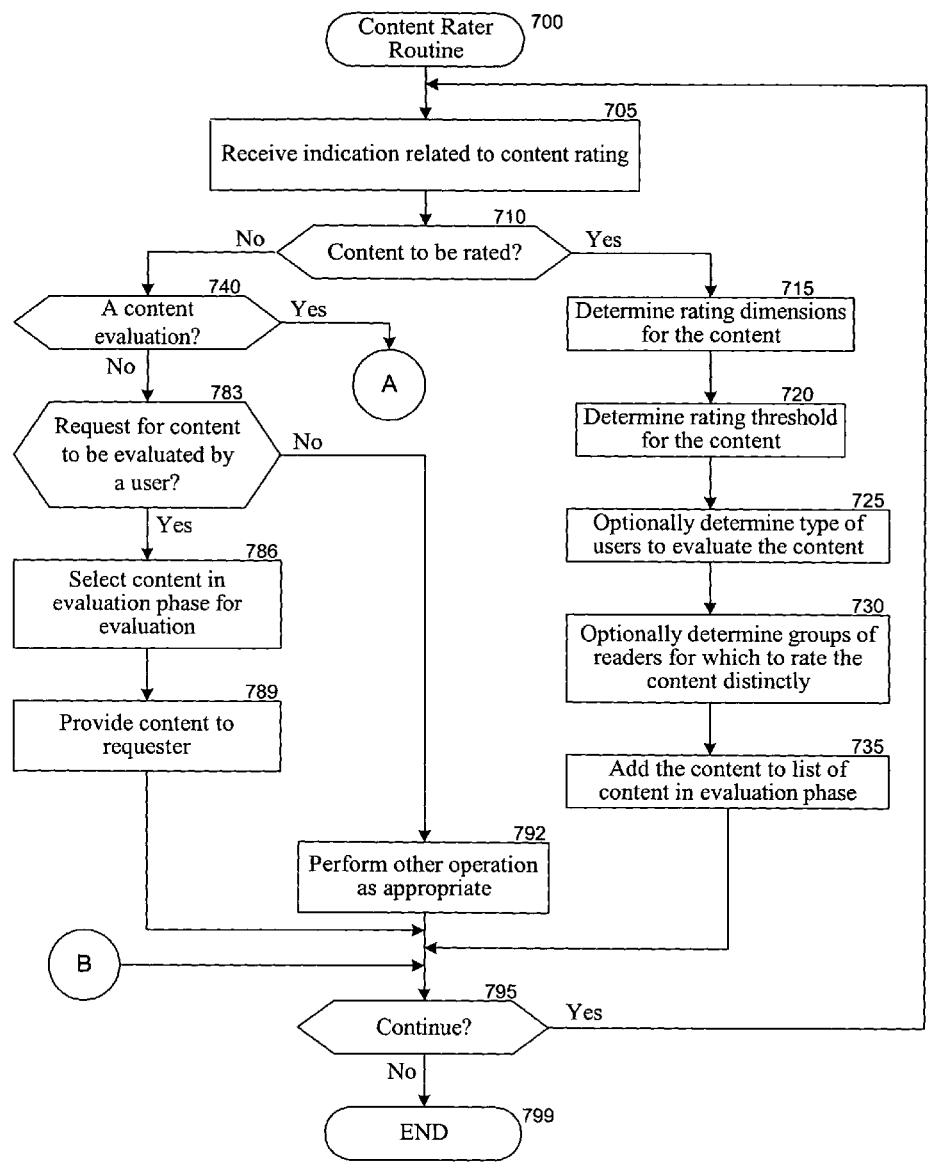
FIGS. 7A and 7B are a flow diagram of an embodiment of a Content Rater routine.
Figure 7B:
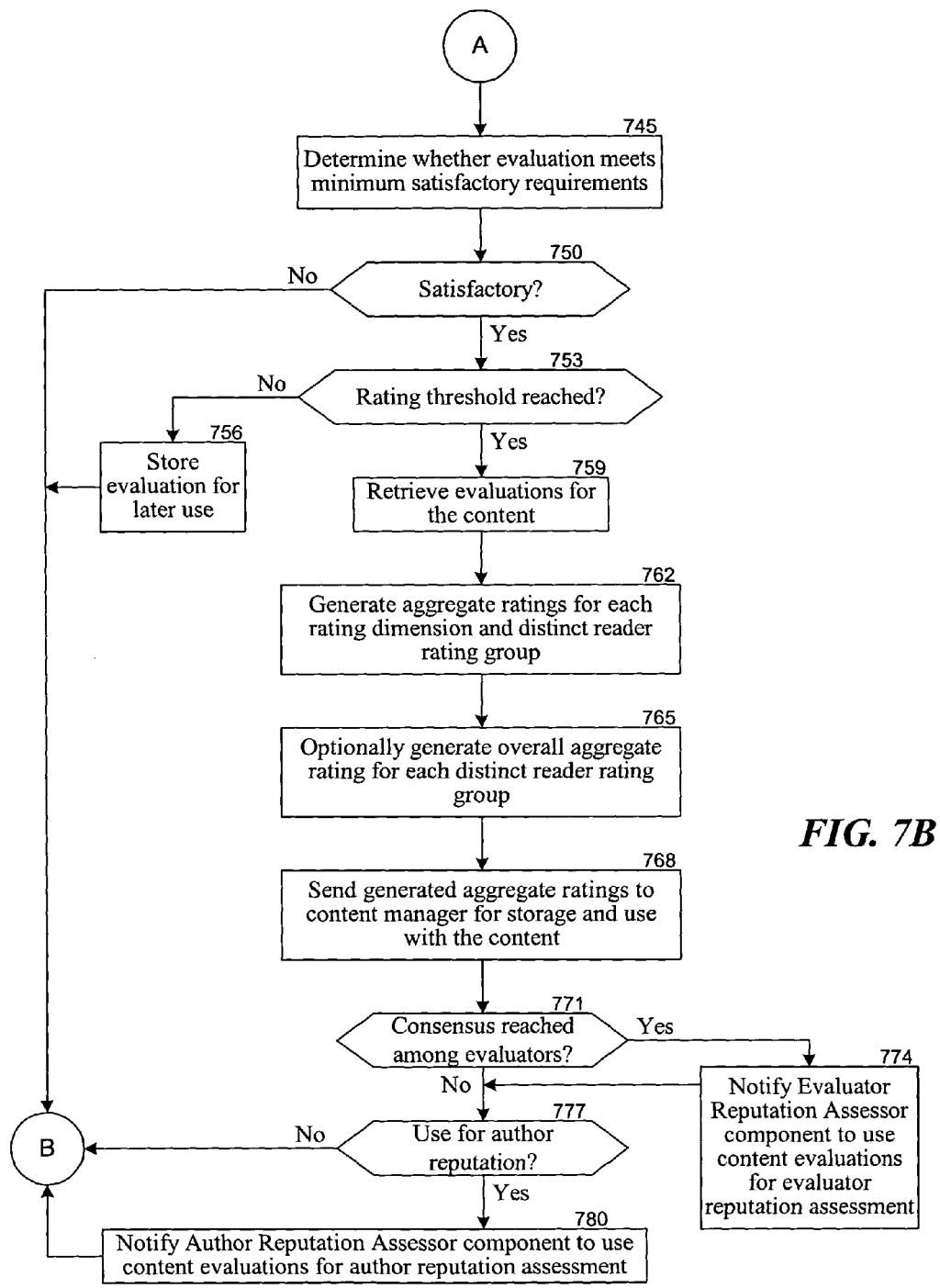

FIGS. 7A and 7B are a flow diagram of an embodiment of the Content Rater routine. The routine 700 determines parameters to be used when rating content, obtains evaluations for content to be rated (e.g., newly submitted content), and rates the content after sufficient evaluation has occurred, with the weighted content then available for use by the system (e.g., to display to appropriate readers if the content rating(s) is sufficiently high). While content is rated initially before being put into use in this illustrated embodiment, in other embodiments a similar routine could be invoked dynamically to provide current ratings for a piece of content when requested based on whatever relevant information was available at that time.

The routine begins at step 705, where an indication is received related to content rating to be performed. The routine continues to step 710 to determine whether the received indication was of content to be rated. If so, the routine continues to step 715 to determine rating dimensions to use for the content, and in step 720 determines one or more criteria to use when determining whether a rating threshold is reached that indicates sufficient evaluation of the content has occurred. The routine then continues to step 725 to optionally determine types of users (and/or specific users) who are appropriate to evaluate this content, such as based on those users having a special aptitude for the type of content to be evaluated and/or on user preferences (e.g., preferences to not evaluate any content, or to evaluate content of specified types). In step 730, the routine then optionally determines subsets of readers for which the content will be distinctly rated, such as based on age, gender, geographic location, etc. The routine then continues to step 735 to add the content to a list of content that is currently in its evaluation phase, including storing indications of the determined information for the content.

If it was instead determined in step 710 that the indication received in step 705 was not of content to be rated, the routine continues instead to step 740 to determine whether a content evaluation was received. If so, the routine continues to step 745 to assess the evaluation to verify that it satisfies minimum criteria for an appropriate evaluation (e.g., it includes any required ratings and is in any required format, does not include disallowed information such as obscenities, is from a user that is allowed to act an as evaluator for this content, etc.). The routine then continues to step 750 to determine if the evaluation is satisfactory, and if so continues to step 753 to determine whether the rating threshold for this content has now been reached (e.g., based on a number of evaluations received, an amount of time elapsed for evaluation, a total number of weighted evaluation votes, etc.). If not, the routine continues to step 756 to store the evaluation for later use, but if so the routine instead continues to step 759 to retrieve the satisfactory evaluations for the content for use in the rating process.

The routine then continues to step 762 to generate an aggregate rating for the content for each rating dimension and for each distinct group of readers (if any) that are to have separate ratings. In some embodiments, the reputations of the evaluators influence how their evaluations are used during the generating of the aggregate rating, such as to give greater weight to the ratings from some evaluators based on their past evaluation performance, or to instead exclude evaluations for some or all rating dimensions for specified evaluators or types of evaluators. In addition, in some embodiments, other factors can also be used in the rating, whether in addition to or instead of reputation-based weighting, such as the use of weighting based on prior sales (e.g., giving greater weight to evaluators that have contributed a greater amount of relevant prior sales, such as sales in the same category of products for which a product review piece of content corresponds to).

After step 762, the routine continues to step 765 to optionally generate an overall aggregate rating for each distinct group of readers for which separate content ratings are being generated, and then continues to step 768 to send an indication of the content and of its generated ratings to the content management system. In some embodiments, the evaluations for a piece of content will similarly be stored by the content management system in a manner associated with the content, whether as separate items or as an integral part of a single group that includes that content and the evaluations. In addition, in some embodiments in which separate content ratings are generated for distinct groups of readers, a single overall aggregate rating may also be generated for the content.

After step 768, the routine then continues to step 771 to assess the evaluations received for the content in order to determine whether consensus was reached among the evaluators. Consensus can be determined among evaluations in a variety of ways, such as to ensure that a minimum specified percentage of the ratings are sufficiently close to an average rating (e.g., to exclude ratings in which multiple large groups of ratings with significantly different values occur, which in some embodiments can prompt a situation in which the system can automatically separate the ratings into multiple groups based on identifying criteria determined for the respective evaluators so that separate groups of ratings are calculated for groups of readers corresponding to the determined identifying criteria). In other embodiments, other criteria could be used to determine whether a threshold has been reached by the evaluations that is sufficient to use the evaluations in assessing the reputation of the evaluators. If it was determined in step 771 that consensus was reached, the routine continues to step 774 to notify the evaluator reputation assessor component of the evaluation received for the content. After step 774, or if it was instead determined in step 771 that consensus was not reached, the routine continues to step 777 to determine whether to use the content evaluation for assessing the reputation of the author of the content, such as based on whether consensus was reached among the evaluators and/or by using other criteria. If so, the routine continues to step 780 to notify the author reputation assessor component of the evaluations for the content.

If it was instead determined in step 740 that the indication received in step 705 was not a content evaluation, the routine continues instead to step 783 to determine whether a request was received to select content to be evaluated by an indicated user. If so, the routine continues to step 786 to select one of the pieces of content currently in its evaluation phase, such as based on information about the user (e.g., preferences of the user), a group or category to which the user belongs (e.g., being among those identified in step 725 for the content), etc. The routine then continues to step 789 to provide the selected content to the requester for evaluation by the user, although in other embodiments the routine could instead provide the content and an evaluation solicitation directly to the user.

If it was instead determined in step 783 that the indication received in step 705 was not a request for content to be evaluated, the routine continues instead to 792 to perform another indicated operation if appropriate, such as to delete one or more previously provided evaluations, to end the evaluation phase for one or more indicated pieces of content, to update a rating for previously rated content (e.g., based on additional provided rating information, such as from readers to whom the content was provided), to modify various of the rating criteria in use for content currently in the evaluation phase, etc. After steps 735, 756, 780, 789, or 792, or if it was determined in step 750 that a received evaluation was not appropriate, or in step 777 that content evaluations were not to be used to assess the author's reputation, the routine continues to step 795 to determine whether to continue. If so, the routine returns to step 705, and if not the routine continues to step 799 and ends.

Figure 8:
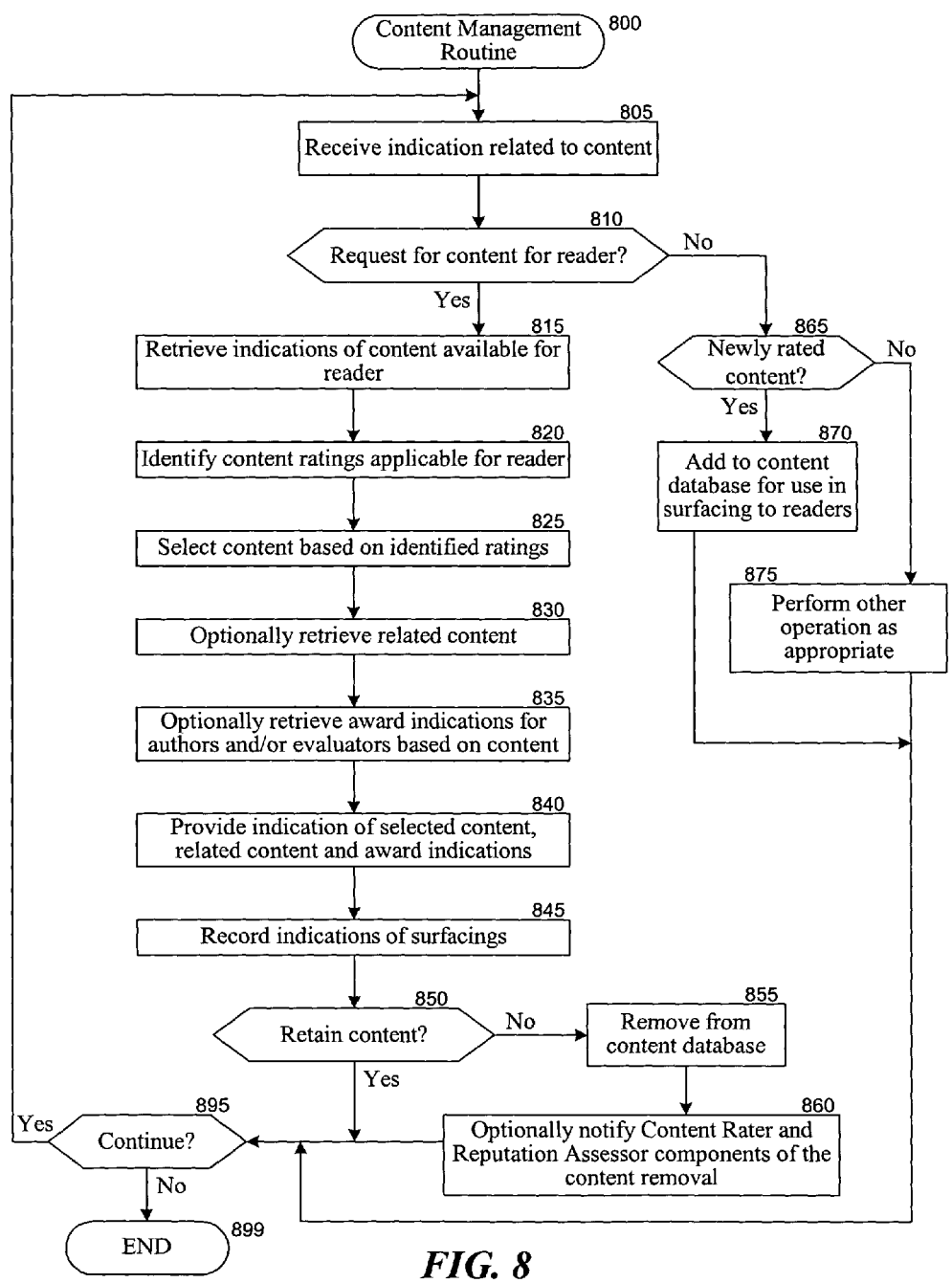
FIG. 8 is a flow diagram of an embodiment of a Content Management routine.

FIG. 8 is a flow diagram of an embodiment of a Content Management routine. The routine 800 manages rated content, such as by providing appropriate content to readers. In the illustrated embodiment, the content being managed is user-provided reviews that have associated evaluations from other users, but in other embodiments a variety of other types of content could be similarly managed. In addition, in some embodiments review evaluations could themselves be evaluated by other users and rated, such as to further enhance the calculation of reputations of evaluators and/or of evaluated content authors.

The routine begins in step 805, where an indication is received related to content. The routine continues to step 810 to determine whether the indication received was a request for content to provide to a reader. If so, the routine continues to step 815 to retrieve indications of content available to be presented to the reader, as well as various related information for the content (e.g., surfacing information about previous instances of providing the content to readers). In some embodiments, certain content may be eliminated for consideration, such as based on content previously provided to the reader, on one or more groups to which the reader belongs, on preferences of the reader, etc. In addition, the related information that is retrieved in step 815 includes indications of previously generated ratings for the content in the illustrated embodiment, although in other embodiments the ratings for content could instead be dynamically generated each time the content is considered, such as by the Content Management routine interacting with an embodiment of the Content Rater routine.

After step 815, the routine continues to step 820 to identify content ratings that are appropriate for the reader for the indicated content (if multiple ratings are available, such as for different groups of readers). The routine then continues to step 825 to select one of the pieces of content for the reader based at least in part on the ratings of the content, such as to select the highest rated of the content or instead to make the selection in conjunction with other considerations (e.g., preferences of the reader). After step 825, the routine continues to step 830 to optionally retrieve related information to include with the content, such as one or more of the evaluations for the content. A selection of only certain evaluations to be included can be made in a variety of ways, such as based on reputations of the evaluators that provided the evaluations (e.g., to allow evaluators with the highest reputations to receive the most presentations of their evaluations). The routine then continues to step 835 to determine whether any award indications should be included along with the presentation of the content, such as badges for authors and/or evaluators based on their reputations (e.g., for those having high rankings). The routine then continues to step 840 to provide an indication of the content and of the related information to the requester for presentation to the reader, although in other embodiments the routine could instead provide the information directly to the reader. In step 845, the routine then records an indication of the surfacing of the content and related information for later use.

The routine then continues to step 850 to determine whether to discard the content or to instead retain it for later use, such as based on an amount of time that it has been in use, a number of surfacings that it has received, etc. If the content is not to be retained, the routine continues to step 855 to remove the content from the content database, and step 860 optionally notifies the Content Rater component to modify reputation calculations so that they are no longer based on evaluations of this content.

If it was instead determined in step 810 that the indication received in step 805 was not a request for content to select for a reader, the routine continues instead to step 865 to determine whether an indication of newly rated content has been received. If so, the routine continues to step 870 to add the newly rated content along with its ratings to the content database for use in later surfacing to readers. If it was instead determined in step 865 that the received indication was not of newly rated content, the routine continues instead to step 875 to perform another indicated operation if appropriate (e.g., to remove content from the database, to modify information associated with stored content, etc.). After steps 860, 870, or 875, or if it was instead determined in step 850 to retain the content selected, the routine continues to step 895 to determine whether to continue. If so, the routine returns to step 805, and if not the routine continues to step 899 and ends.

Figure 9:
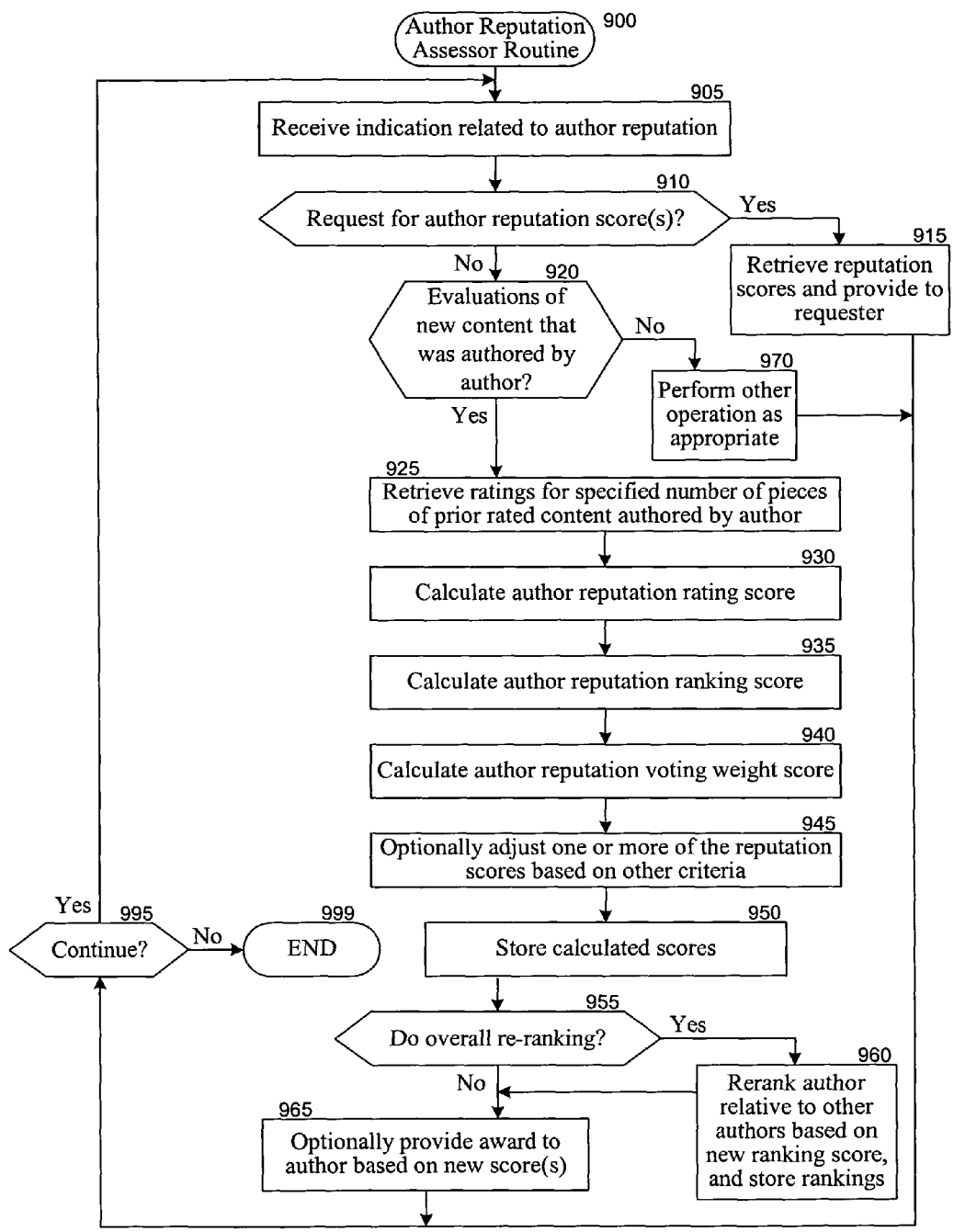
FIG. 9 is a flow diagram of an embodiment of an Author Reputation Assessor routine.

FIG. 9 is a flow diagram of an embodiment of an Author Reputation Assessor routine. The routine 900 receives indications of content by an author that has been rated, as well as other types of requests, and updates various automatically calculated reputation scores for the author based on the evaluations. While authors' reputations and corresponding overall rankings are generated and stored for later use in this illustrated embodiment, in other embodiments a similar routine could be invoked dynamically to provide current reputation assessments when requested based on whatever relevant information was available at that time.

The routine begins at step 905, where an indication is received that is related to the reputation of an author. The routine continues to step 910 to determine whether the received indication is a request for one or more reputation scores for one or more authors, and if so continues to step 915 where the requested scores are retrieved and provided to the requester as appropriate. In some embodiments, the routine may require verification of authority of the requester to receive the requested scores. In some such embodiments, the scores are provided to external systems, such as to provide automatically calculated author reputation scores to third parties that could then use those scores in determining how to interact with those authors and/or others. While not illustrated here, the routine could in some embodiments similarly receive reputation assessments for authors from other external systems, and incorporate those assessments along with its own (e.g., by tracking and using the assessments separately, or instead generating an overall assessment based on the combination of the assessments).

If it was instead determined in step 910 that the indication received in step 905 was not a request for reputation scores, the routine continues instead to step 910 to determine whether the indication received was of evaluations of a new piece of content by the author that has been rated, so as to enable the reputation of the author to be correspondingly adjusted. If so, the routine continues to step 925 to retrieve evaluation ratings for a specified number of pieces of content by the author that previously had been rated, whether the retrieved ratings include only the generated aggregate ratings or instead individual ratings for each evaluator of those pieces of content. In the illustrated embodiment, the routine then continues to step 930 to use the various content ratings to adjust the author's reputation scores, but in other embodiments the routine could instead first verify that it was appropriate to currently make such an adjustment, such as if author reputation scores for this and/or other authors are instead calculated at other times (e.g., on a periodic basis, as requested, etc.). In addition, in other embodiments the routine could first determine whether a specified threshold for adjusting the reputation of the author has been satisfied by the various content ratings before proceeding with reputation assessment.

In step 930, the routine next calculates an author reputation rating score for the author based on an average of the ratings that the content authored by the author has received—in other embodiments, other techniques for calculating a ratings score could instead be used. The routine then continues in the illustrated embodiment to step 935, where an author reputation ranking score is calculated based on both the quantity and quality of the content ratings for the content authored by the author, such as by summing the aggregate ratings for a specified number of prior rated pieces of content—in other embodiments, other techniques could instead be used to calculate a ranking score. The routine then continues to step 940 where an author reputation voting weight score is calculated based on the consistency of the ratings of the content authored by the author over a specified prior number of pieces of content—in other embodiments, other techniques could instead be used to calculate a voting weight score. After step 945, the routine continues to step 950 to store the newly calculated reputation scores for later use. In this illustrated embodiment, the various author reputation scores are calculated based on the same set of rated content by the author, but in other embodiments different groups of content could instead be used for each of the different types of author reputation scores.

After step 950, the routine continues to step 955 to determine whether the author should be re-ranked relative to other authors at this time, and if so continues to step 960 to re-rank the author based on the author's reputation ranking score relative to the author reputation ranking scores of other authors, and stores the resulting ranking list for later use. After step 960, or if it was instead determined in step 955 not to do re-ranking (e.g., if it is performed at other times, such as periodically or dynamically upon request), the routine continues to step 965 to optionally provide one or more award indications to the author based on the newly calculated scores, such as to display indications of their new rank, of one or more of their new scores, of changes in their overall rank and/or scores over time, to provide a monetary or monetary equivalent adjustment to the author based on one or more of their new scores and/or ranking, etc.

If it was instead determined in step 920 that the received indication in step 905 was not evaluations for a new piece of content that has been rated, the routine continues instead to step 970 to perform another requested operation if appropriate (e.g., adjusting one or more author reputation scores for one or more indicated authors, adjusting rankings of authors in a specified manner, performing a new re-ranking author calculation based on current author reputation ranking scores, etc.). After steps 915, 965, or 970, the routine continues to step 995 to determine whether to continue. If so, the routine returns to step 905, and if not the routine continues to step 999 and ends.

Figure 10:
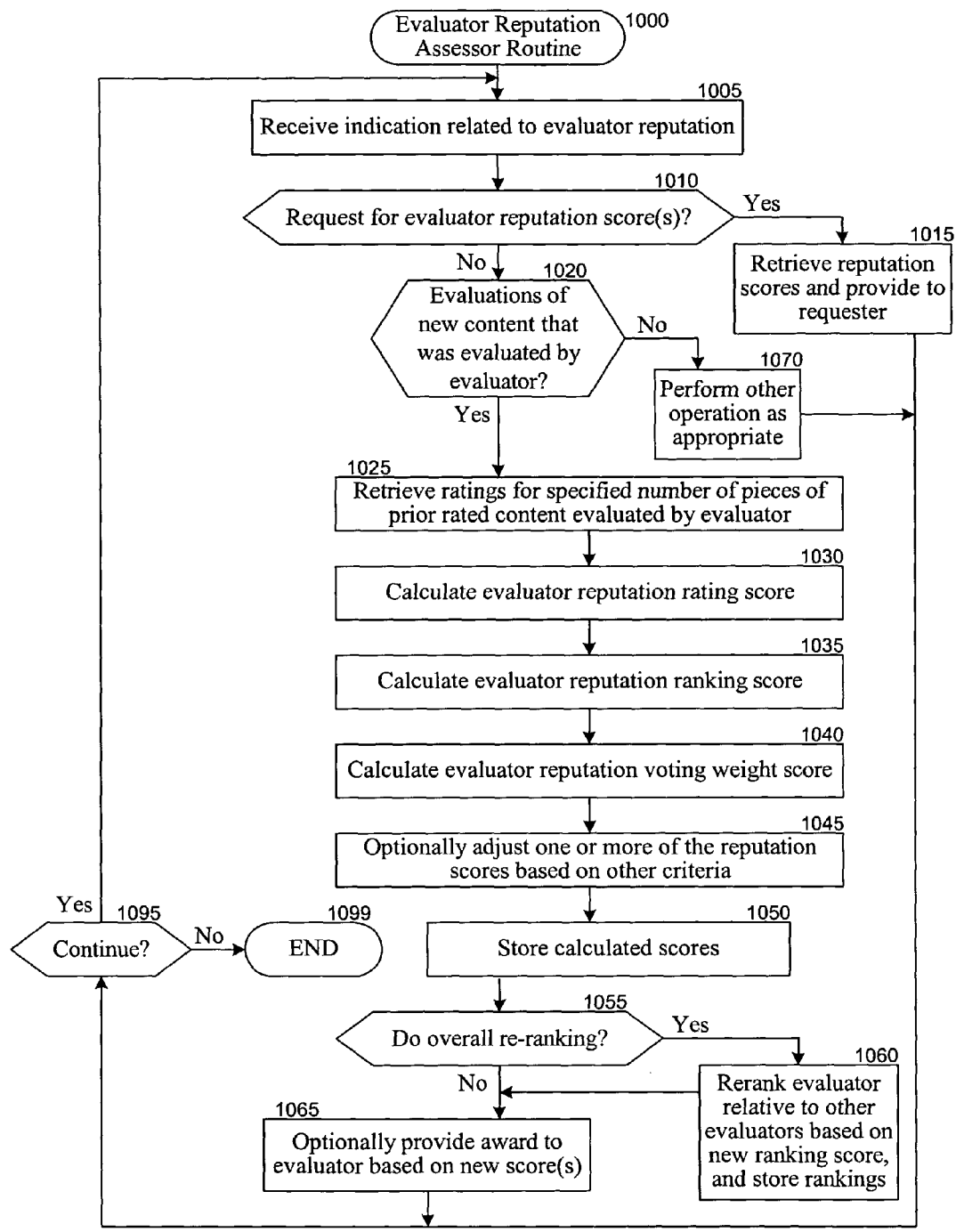
FIG. 10 is a flow diagram of an embodiment of an Evaluator Reputation Assessor routine.

FIG. 10 is a flow diagram of an embodiment of an Evaluator Reputation Assessor routine. The routine 1000 receives indications of various evaluations of rated content for use in assessing evaluators' reputations, as well as other types of requests, and updates various automatically calculated reputation scores for evaluators based on the evaluations. While evaluators' reputations and corresponding overall rankings are generated and stored for later use in this illustrated embodiment, in other embodiments a similar routine could be invoked dynamically to provide current reputation assessments when requested based on whatever relevant information was available at that time.

The routine begins at step 1005, where an indication is received that is related to the reputation of an evaluator. The routine continues to step 1010 to determine whether the received indication is a request for one or more reputation scores for one or more evaluators, and if so continues to step 1015 where the requested scores are retrieved and provided to the requester as appropriate. In some embodiments, the routine may require verification of authority of the requester to receive the requested scores. In some such embodiments, the scores are provided to external systems, such as to provide automatically calculated evaluator reputation scores to third parties that could then use those scores in determining how to interact with those evaluators and/or others. While not illustrated here, the routine could in some embodiments similarly receive reputation assessments for evaluators from other external systems, and incorporate those assessments along with its own (e.g., by tracking and using the assessments separately, or instead generating an overall assessment based on the combination of the assessments).

If it was instead determined in step 1010 that the indication received in step 1005 was not a request for reputation scores, the routine continues instead to step 1010 to determine whether the indication received was of evaluations of a new piece of rated content. If so, the routine continues to step 1025. In the illustrated embodiment, steps 1025-1050 will be performed for each of the evaluators that evaluated the rated content in order to assess the reputation of each of those evaluators (although only a single instance of the steps is illustrated), although in other embodiments the routine could instead be invoked for a single evaluator. In step 1025, evaluations are retrieved for one of the evaluators for a specified number of pieces of rated content for which that evaluator previously participated in the rating. In the illustrated embodiment, the routine then continues to step 1030 to use the various content ratings to adjust the evaluator's reputation scores, but in other embodiments the routine could instead first verify that it was appropriate to currently make such an adjustment, such as if evaluator reputation scores for this and/or other evaluators are instead calculated at other times (e.g., on a periodic basis, as requested, etc.). In addition, in other embodiments the routine could first determine whether a specified threshold for adjusting the reputation of the evaluator has been satisfied by the various content ratings before proceeding with reputation assessment.

In step 1030, the routine next calculates an evaluator reputation rating score for the evaluator based on the quality of the evaluator's rating, which in the illustrated embodiment is measured by an average degree of agreement between the ratings of the evaluator for each of the pieces of content and the consensus ratings by other evaluations for those pieces of content—in other embodiments, other techniques for calculating a ratings score could instead be used. The routine then continues in the illustrated embodiment to step 1035, where an evaluator reputation ranking score is calculated based on both the quantity and quality of the evaluations by the evaluator, such as by summing a numerical rating of the degrees of agreement between the evaluator's ratings and the consensus ratings of the other evaluators for a specified number of prior rated pieces of content—in other embodiments, other techniques could instead be used to calculate a ranking score. The routine then continues to step 1040 where an evaluator reputation voting weight score is calculated based on an overall degree of agreement between the evaluator's ratings and the consensus ratings of the other evaluators—in other embodiments, other techniques could instead be used to calculate a voting weight score. After step 1045, the routine continues to step 1050 to store the newly calculated reputation scores for later use, and then repeats steps 1025 through 1050 for each of the evaluators of the current content. In this illustrated embodiment, the various evaluator reputation scores for an evaluator are calculated based on the same set of rated content evaluated by the evaluator, but in other embodiments different groups of evaluated content could instead be used for each of the different types of evaluator reputation scores.

After step 1050, the routine continues to step 1055 to determine whether the evaluators should be re-ranked relative to other evaluators at this time, and if so continues to step 1060 to re-rank the evaluators based on the evaluators' reputation ranking scores relative to the evaluator reputation ranking scores of other evaluators, and stores the resulting ranking list for later use. After step 1060, or if it was instead determined in step 1055 not to do re-ranking (e.g., if it is performed at other times, such as periodically or dynamically upon request), the routine continues to step 1065 to optionally provide one or more award indications to one or more of the evaluators based on the newly calculated scores, such as to display indications of their new rank, of one or more of their new scores, of changes in their overall rank and/or scores over time, to provide a monetary or monetary equivalent adjustment to the evaluator based on one or more of their new scores and/or ranking, etc.

If it was instead determined in step 1020 that the received indication in step 1005 was not evaluations for a new piece of content that has been rated, the routine continues instead to step 1070 to perform another requested operation if appropriate (e.g., adjusting one or more evaluator reputation scores for one or more indicated evaluators, adjusting rankings of evaluators in a specified manner, performing a new re-ranking evaluator calculation based on current evaluator reputation ranking scores, etc.). After steps 1015, 1065, or 1070, the routine continues to step 1095 to determine whether to continue. If so, the routine returns to step 1005, and if not the routine continues to step 1099 and ends.

The following provides additional details regarding one example of specific techniques for calculating reputation scores for authors and evaluators and for using such reputation scores.

In particular, in this example an author's reputation is intended to reflect that author's past performance in authoring content of a specific quality and to predict the likelihood that they will create content of similar qualities in the future. Similarly, an evaluator's reputation is intended to reflect that evaluator's past performance in representing the behavior of other evaluators and to predict the likelihood that they will continue to provide that level of representative behavior in the future. In addition, since an author's reputation voting weight score influences the ratings that a new piece of content that they author will receive, their reputation affects the surfacing of their content, which may in turn have an effect on their reputation in the future. Similarly, an evaluator's reputation weight may affect the surfacing of their evaluations.

In this example, each user and piece of content receives a unique identifier to allow it to be easily tracked and identified. In other embodiments, a single user and/or piece of content could instead be given multiple unique identifiers to represent different roles or uses, such as a role of a user as an author versus an evaluator, or the role of content when being presented to different groups of users for which separate content ratings are tracked.

In addition, this example will discuss only the rating of content along a single rating dimension, with evaluators able to provide rating votes with a numerical value between 1 and 5. The same techniques could be used for other rating dimensions, and to combine aggregate ratings for multiple rating dimensions into an overall aggregate rating.

In this example, content has a content lifecycle that includes four stages, as follows: new, evaluation, rated, and deleted. "New" content is material that has just been submitted to the system by an author. When content is "new", it can be assigned a content rating based on the past performance of its author. If this is the first piece of content produced by this author, then the author is assigned a default rating based on the average performance of other authors. Once an initial rating has been assigned, the content can then move to the "evaluation" stage.

"Evaluation" is a stage during which the content is presented to evaluators for rating. In this example, the content is surfaced without providing any rating information or author information in order to eliminate bias in voting. The rating threshold to end the evaluation stage is a fixed number of "voting equivalents" in this example, which are calculated to be a cumulative weighted number of rating votes, although other types of rating thresholds include non-weighted voting, a set amount of time, and a number of content surfacings to evaluators (also referred to as "impressions") regardless of whether the evaluators actually perform a rating. In this example, reputation voting weight scores represent voting equivalents, which thus provide different authors and evaluators with differing degrees of power. As noted above, evaluators and authors acquire voting equivalents (and hence power) by demonstrating different aptitudes, which for authors is consistency (the content they author is usually the same quality), and for evaluators is the ability to predict how other evaluators will vote.

When the evaluation stage ends, the content can move to the "rated" stage. "Rated" is the stage in which the evaluator rating votes are processed and then made available, both to the content manager and to different end-users. There are several different kinds of processing that take place. First, a content rating score is computed based on reputation-weighted voting as shown below, where WeightedAverage(c) is the reputation-weighted average of all the rating votes cast on the content C, VotingWeight(a) is the reputation voting weight earned by author A based on past performance, VotingWeight(e) is the reputation voice weight earned by evaluator E based on past performance, Average(a) is the average reputation rating score earned by A, and Vote(e,c) is the rating vote value cast by E.

$$WeightedAverage(c) = \frac{VotingWeight(a) * Average(a) + \sum_{\substack{e \in Elevators \\ voting\ on\ c}} VotingWeight(e) * Vote(e, c)}{VotingWeight(a) + \sum_{\substack{e \in Elevators \\ voting\ on\ c}} VotingWeight(e)}$$

Once the content is in the "rated" stage, the content management system can surface the content rating, and rating voting on the content may in some embodiments be suspended at this point to preserve the non-biased nature of the voting. The rating can also now be used by the content manager's surfacing algorithm to determine how many impressions the content should receive. Additionally, if sufficient votes have been received, the reputation-weighting algorithms for calculating reputations for both authors and evaluators can be performed.

The last content stage is "deleted". In this stage, the content is no longer available for surfacing, and no further votes will be received or processed. Furthermore, in some embodiments the rating scores for the content may be removed from any affected reputations, which can be useful if the content rating is determined to be tainted (e.g., by fraud or some other form of abuse).

In this example, author reputation is intended to characterize the authors who are contributing content. Initially an author is given an average reputation, and as content authored by the author emerges from its evaluation stage, the author's reputation may be given credit along each dimension for the rating votes that the content has received.

First, an average reputation rating score is computed for the author that reflects the quality of the work done by the author, which in this example is the average of reputation-weighted rating scores for all content authored by this person over the last N1 days (with N1 set to a number specified by a particular implementation, such as 50)—such a temporal component rewards active participation by authors.

$$WeightedAvg(a) = \frac{\sum_{\substack{c \in Content \\ created\ by\ a}} WeightedAvg(c)}{\sum_{\substack{c \in Content \\ created\ by\ a}} 1}$$

Next, a reputation ranking score is computed based on the quality and quantity of the content, which in this example is the sum of the reputation-weighted average content ratings for the last N2 days (e.g., the same as N1). As with the reputation rating, this temporal component rewards active participation. The reputation ranking score is then saved, and periodically a total order on all authors is computed based on the ranking scores. The specific position of an author in this ranking is known as that author's "rank", which can be surfaced to all end-users, and which provides a tangible performance-based incentive for authors to produce high quantities of high-quality content.

Finally, a reputation voting weight (or "power") score is computed, which is the weight that an author's rating carries in the computation of a content rating score. In this example, an average credit across the past N3 (e.g., 50) pieces of content (or "Cs") created by this author is computed—if the author has created a number N4 of Cs that is less than N3, an average credit of 0.1 is substituted for each of (N3−N4) votes instead. The credit for each C is determined as follows, with C.WeightedAverage representing the weighted average content rating for a piece of content and A.WeightedAverage representing the reputation rating score for the author.

1 if |C.WeightedAverage−A.WeightedAverage|≤1

0 otherwise

The average credit is then mapped into a reputation voting weight score, with the score (also referred to here as a "voting equivalent") being the multiple by which an author's rating vote is multiplied, thus giving its holder more power when content scores are computed, which in turn can influence not only surfacing but ranking as well. In this example, the reputation voting weight score is calculated as follows:

| Avg. credit | Voting Equivalents |
| --- | --- |
| <=0.15 | 1 |
| <=0.3 | 2 |
| <=0.5 | 3 |
| <=0.8 | 4 |
| <=1.0 | 5 |

The various author reputation scores are valuable not only to the author, but to others as well. For authors, their reputation rating and ranking scores can result in badges that are surfaced on a Website alongside their content or their names, which allows authors to compete with each other. For readers, the ratings and rankings can provide navigational aids when browsing the Website, such as a "Top-100 Reviewers" page, which allows readers to identify the "best" authors. In addition, the change over time in an author's rank can also be computed to identify those authors who are "moving up" the fastest, which can also be a useful navigational aid for readers. Moreover, while simple counts of the raw number of evaluation rating votes cast can provide some information, reputation-weighted results are useful because over time they reflect a sense of values and interests of the relevant community.

For operators of a Web site that desire to provide useful content to users, author reputation ratings and rankings are useful for making content surfacing decisions. For example, content from good authors may be favored for "spotlight" reviews or at particular locations (e.g., a Website home page). Reputation ratings and rankings can also be used by the operator for "policing", such as to identify abusive authors and content so that they can be removed from the Website—for example, author reputation ratings and rankings can help to identify authors who have a history of poor or abusive performance so they can be censored from the Website.

In a manner similar to that for authors, evaluators also start with an average reputation and base amount of voting power in this example, with evaluator reputation intended to identify evaluators that are good at predicting how the other evaluators will vote in order to give those evaluators more voting power. Conversely, those evaluators who do a poor job at such prediction have their voting power diminished. When a piece of content comes out of its evaluation period, it is used to adjust evaluators' reputation if the content has sufficient number of votes.

In this example, the reputation rating score of an evaluator is the average consensus credit of the evaluation across the last N5 (e.g., 50) votes. For each piece of content C that an evaluator E votes on, the evaluator receives a consensus credit as follows: +1 if their rating vote value was the same as the consensus rating vote value, 0 if it was close (was in this example means being adjacent to the consensus value), and −1 otherwise. The technique for determining consensus in this example is described below.

For evaluator Es that have cast a number N6 of evaluation rating votes that is less than N5, an average credit of 0.1 is substituted for each of (N5−N6) votes, which has the effect of having the average consensus credit of a new E gradually converge from 0.1 to its ultimate value, and it avoids situations where a new E immediately receives a high voting equivalent based on only a limited number of accurate rating votes. In particular, in this example the average consensus credit is calculated as follows:

$$\text{Average Concensus Credit} = \frac{1}{N5} \times \left( \sum_{\substack{last\ min(N5,N6) \\ C\text{'s that } E \\ voted\ on}} f(\text{Vote}(e, c)) + \max(N5 - N6, 0) \times 0.1 \right)$$

where $$f(x) = \begin{cases} 1, & \text{if Bucket(Vote}(e, c)) = ConsensusBucket(c) \\ 0, & \text{if |Bucket(Vote}(e, c)) - ConsensusBucket(c)| = 1 \\ -1, & \text{otherwise} \end{cases}$$

The reputation ranking score of an evaluator is then computed by taking the sum of the average consensus credit scores over the last N7 (e.g., the same as N1) days. The evaluator's reputation voting weight score is then determined based on the reputation ranking score of the evaluator, as follows:

| Avg. consensus credit | VE |
| --- | --- |
| ≤0.00 | 0.01 |
| ≤0.15 | 1 |
| ≤0.30 | 2 |
| ≤0.50 | 3 |
| ≤0.80 | 4 |
| >0.80 | 5 |

These evaluator reputation scores are valuable not only to the evaluators, but also to other users. For evaluators, the reputation rating scores can provide a sense of how they are voting relative to other voters, while the reputation ranking scores can provide evaluators with feedback and a competitive incentive to vote more often. For an operator of the Web site, the evaluator reputation scores enable content surfacing to make good choices when surfacing content for evaluation, as well as for surfacing appropriate evaluations for content. In addition, evaluator reputation scores allow evaluators that are inconsistent or have atypical evaluations to be identified, such as to allow votes from those evaluators to be ignored.

As previously noted, the evaluator reputation scores in this example are based on determining consensus evaluation ratings for content, with the example consensus determination technique based on analyzing a group of rating values as follows, with parameters N, P, D1, and D2 as described below:

1. Assign each value to a bucket, and generate a histogram of buckets.
2. Find the average value and the bucket avgBucket it belongs to.
3. Try to find N adjacent buckets that include avgBucket and together contain more than P percent of all votes. If this is possible, then the consensus is avgBucket. If it is not possible, then there is no consensus.
4. If consensus exists, those values that are within a distance of D1 or less from avgBucket are rewarded with a credit of +1 and those that are at a distance of D2 or more are punished with a credit of −1.
   N is the size of a neighborhood around the consensus bucket that are close enough to be considered to constitute agreement. If the values are in the range [1.5], for example, N may be 2. For the range [1.100], N being 10 may be better, and for the range [0.1] a value of 1 would be selected for N.
   P determines how pronounced the consensus needs to be before it is recognized. A useful value for P might be 0.7 or 0.75.
   D1 determines how close to the average a voter needs to be to get rewarded. For the value range [1.5], D1 being 0 can be used.
   D2 determines how far away from the average a voter needs to be to get punished. For the value range [1 ... 5], D2 being 2 can be used.
   The effect of M=0 and D2=2 is that votes that fall in the same bucket as the average value get rewarded (+1), votes that fall in an adjacent bucket do not get rewarded (+0), and votes that are in all other buckets are punished (−1).

While the rating values in this example are from votes on a single piece of content, they could instead in other embodiments be average scores for several pieces of content.

It can also be beneficial to sales-weight the forecasts of evaluator behavior, such as to predict (and reward) those evaluators whose behavior generates the most sales. Sales-weighting can be easily handled by weighting the votes used to compute the mean average, giving heavier spenders more influence on the average. For example, the following formula is used in this example to compute the mean average value when determining consensus:

$$\text{Average}(c) = \frac{\sum_{i \in \text{Voters on } c} v_i \$_i}{\sum_{i \in \text{Voters on } c} \$_i}$$

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for selecting information to provide to users based on reputations of evaluators of the information, the method comprising:
   receiving from a reviewer user a review related to an item available from a Web merchant, the receiving of the review being performed by one or more programmed computing systems of the Web merchant;
   receiving multiple evaluations of the review, each of the multiple evaluations being from one of multiple evaluator users who each has an existing reputation weight for the Web merchant that is based at least in part on previous evaluations supplied by that evaluator user for multiple other reviews for items available from the Web merchant, each received evaluation including a quantitative assessment of contents of the review for each of one or more of multiple content rating dimensions available for use in assessing the review;
   automatically generating an aggregate assessment of the content of the review based at least in part on combining quantitative assessments from the received evaluations for the review, the generated aggregate assessment being further based on the existing reputation weights of the evaluator users in such a manner that a first quantitative assessment from a first evaluator user with a first reputation weight has a different impact on that generated aggregate assessment than that first quantitative assessment from a distinct second evaluator user with a distinct second reputation weight, the automatic generating being performed by the one or more programmed computing systems;
   automatically updating the existing reputation weights for each of one or more of the evaluator users based on a relationship of the quantitative assessments from the evaluation of that evaluator user to the quantitative assessments from the evaluations of other of the evaluator users, the automatic updating being performed by the one or more programmed computing systems; and
   for each of multiple additional users of the Web merchant who are distinct from the multiple evaluator users and from the reviewer user, determining whether to provide the review to the additional user based at least in part on the automatically generated aggregate assessment for the content of the review.

2. The method of claim 1 including, before the automatic updating of the reputation weights of the one or more evaluator users, determining whether the received evaluations satisfy an evaluator reputation calculation threshold, and wherein the automatic updating of the reputation weights of the one or more evaluator users is performed only when it is determined that the received evaluations satisfy the evaluator reputation calculation threshold.

3. The method of claim 2 wherein the evaluator reputation calculation threshold is based at least in part on a minimum degree of consensus existing among the received evaluations, and wherein the determining includes automatically calculating the existing degree of consensus among the received evaluations.

4. The method of claim 1 wherein the relationship of the quantitative assessments from the evaluation of an evaluator user to the quantitative assessments from the evaluations of other of the evaluator users that is used when automatically updating the reputation weight for that evaluator user is based on a degree of agreement between the quantitative assessments from the evaluation of the evaluator user and quantitative assessments from a consensus evaluation for the received evaluations.

5. The method of claim 1 wherein the reputation weights of the evaluator users that are used in the automatic generating of the aggregate assessment of the content of the review were automatically generated based on the previous evaluations by those evaluator users.

6. The method of claim 1 including, after the receiving of the evaluations from the evaluator users, for each of at least some of the evaluations receiving one or more ratings of the evaluation from users other than the evaluator user that provided the evaluation, and automatically modifying the reputation weights for evaluator users whose evaluations received ratings based at least in part on those ratings.

7. The method of claim 1 including, after the automatic updating of the reputation weights of the one or more evaluator users, receiving an indication that the content is no longer in use for determining reputation weights of the evaluator users, and automatically updating the reputation weights for each of those evaluator users to remove influence based on the relationship of the quantitative assessments from the evaluation of that evaluator user to the quantitative assessments from the evaluations of other of the evaluator users.

8. The method of claim 1 wherein the automatic generating of the aggregate assessment of the content of the review is further based in part on an existing reputation weight of the reviewer user from which the review was received.

9. The method of claim 8 wherein the reputation weight of the reviewer user is based on a degree of consistency between the automatically generated aggregate assessment of the content of the review and automatically generated aggregate assessments of the content of previous reviews received from the reviewer user.

10. The method of claim 1 including automatically updating a reputation weight of the reviewer user from which the review was received based at least in part on the automatically generated aggregate assessment of the content of the review.

11. The method of claim 10 including, before the automatic updating of the reputation weight of the reviewer user, determining whether the received evaluations satisfy an author reputation calculation threshold, and wherein the automatic updating of the reputation weight of the reviewer user is performed only when it is determined that the received evaluations satisfy the author reputation calculation threshold.

12. The method of claim 1 including, before the automatic generating of the aggregate assessment of the content of the review, determining whether the received evaluations satisfy a content rating threshold, and wherein the automatic generating of the aggregate assessment of the content of the review is performed only when it is determined that the received evaluations satisfy the content rating threshold.

13. The method of claim 12 wherein the content rating threshold is based at least in part on a weighted number of the evaluations received for the review from the evaluator users that is based on the reputation weights of the evaluator users in such a manner that an evaluation from a first evaluator user with a first reputation weight has a different impact on that weighted number of evaluations than an evaluation from a distinct second evaluator user with a distinct second reputation weight.

14. The method of claim 1 wherein each of the received evaluations includes quantitative assessments of the contents of the review for each of the multiple available content rating dimensions.

15. The method of claim 14 including, before the receiving of the evaluations of the review, determining the multiple available content rating dimensions.

16. The method of claim 1 including, before the receiving of the evaluations of the review, soliciting the evaluator users to provide evaluations of the review, the solicitations including indications of the multiple available content rating dimensions.

17. The method of claim 1 wherein the automatic generating of the aggregate assessment of the content of the review includes generating an aggregate assessment for each of the multiple available content rating dimensions.

18. The method of claim 17 including automatically generating an overall aggregate assessment of the review based at least in part on the multiple automatically generated aggregate assessments of the content of the review for the multiple available content rating dimensions.

19. The method of claim 1 wherein the automatically generated aggregate assessment of the content of the review is further based on a sales weighting for each of one or more of the evaluator users, the sales weighting of an evaluator user reflecting an amount of prior sales to that evaluator user.

20. The method of claim 1 including, after the automatic updating of the reputation weights for the evaluator users, ranking each evaluator user relative to other evaluator users based at least in part on automatically generated evaluator reputation scores of those evaluator users.

21. The method of claim 20 wherein the reputation weight for each of the evaluator users is based on a combination of quantity and quality of evaluations provided by that evaluator user, and including automatically generating a distinct evaluator reputation rating score for each of the evaluator users based solely on the quality of the evaluations provided by that evaluator user, and wherein the evaluator reputation scores used for the ranking are the evaluator reputation rating scores.

22. The method of claim 20 including providing visible feedback to users of the rankings of at least some of the evaluator users.

23. The method of claim 1 wherein at least some of the evaluator users each have multiple existing reputation weights that correspond to previous evaluations by those evaluator users of content of different categories, and including, before the automatic updating of the reputation weights for the evaluator users, determining a category of the review, and wherein the automatic updating of the reputation weights of evaluator users that have multiple existing reputation weights is performed for an existing reputation weight of that evaluator user for the determined category.

24. The method of claim 1 wherein at least some of the evaluator users each have multiple existing reputation weights that correspond to different types of activities previously performed by those evaluator users, and wherein the automatic updating of the reputation weights of evaluator users that have multiple existing reputation weights is performed for an existing reputation weight of that evaluator user corresponding to prior review evaluation activities of that evaluator user.

25. The method of claim 1 including, after the automatic updating of the reputation weights for the evaluator users, providing indications of the reputation weights for one or more of those evaluator users to one or more third-party computing devices to enable interactions by the third-party computing devices with those evaluator users based on those reputation weights.

26. The method of claim 25 wherein the one or more third-party computing devices are provided by an entity that is distinct from the Web merchant.

27. The method of claim 1 including receiving from one or more third-party computing devices information related to the reputations of one or more of the evaluator users, the received information based on interactions of those evaluator users with those third-party computing devices, and automatically updating the reputation weights for each of those evaluator users based on the received information.

28. The method of claim 1 wherein the review is information obtained from a blog authored by the reviewer user.

29. The method of claim 1 wherein the automatic generating of the aggregate assessment of the content of the review based on the existing reputation weights of the evaluator users is performed in a manner independent of the multiple additional users.

30. The method of claim 14 wherein the multiple available content rating dimensions include at least two of usefulness, accuracy, informativeness, and humorousness.

31. The method of claim 17 wherein the multiple available content rating dimensions include at least two of usefulness, accuracy, informativeness, and humorousness.

32. A computer-readable medium whose contents cause a computing device to select information to provide to users based on reputations of evaluators of the information, by performing a method comprising:

receiving from a reviewer user a review related to an available item;

receiving evaluations of the review from each of multiple evaluator users, each received evaluation including a quantitative assessment of contents of the review for each of one or more of multiple content rating dimensions available for use in assessing the review, each of the evaluator users having an existing reputation weight based at least in part on previous evaluations;

automatically generating at least one aggregate assessment of the content of the review based at least in part on combining quantitative assessments from the received evaluations for the review, at least one of the generated aggregate assessments being further based on the reputation weights of the evaluator users in such a manner that a first quantitative assessment from a first evaluator user with a first reputation weight has a different impact on that generated aggregate assessment than that first quantitative assessment from a distinct second evaluator user with a distinct second reputation weight;

automatically updating the reputation weights for each of one or more of the evaluator users based on a relationship of the quantitative assessments from the evaluation of that evaluator user to the quantitative assessments from the evaluations of other of the evaluator users; and determining whether to provide the review to another user based at least in part on one or more of the automatically generated aggregate assessments for the content of the review.

33. The computer-readable medium of claim 32 wherein the relationship of the quantitative assessments from the evaluation of an evaluator user to the quantitative assessments from the evaluations of other of the evaluator users that is used when automatically updating the reputation weight for that evaluator user is based on a degree of agreement between the quantitative assessments from the evaluation of the evaluator user and quantitative assessments from a consensus evaluation for the received evaluations.

34. The computer-readable medium of claim 32 wherein the reputation weights of the evaluator users that are used in the automatic generating of the at least one aggregate assessments of the content of the review are automatically generated based on the previous evaluations by those evaluator users.

35. The computer-readable medium of claim 32 wherein the automatic generating of the at least one aggregate assessments of the content of the review is further based in part on an existing reputation weight of the reviewer user from which the review was received.

36. The computer-readable medium of claim 35 wherein the existing reputation weight of the reviewer user is based on a degree of consistency between one or more of the automatically generated aggregate assessments of the content of the review and automatically generated aggregate assessments of the content of previous reviews received from the reviewer user, and wherein the method further comprises automatically updating the reputation weight of the reviewer user from which the review was received based at least in part on one or more of the automatically generated at least one aggregate assessments of the content of the review.

37. The computer-readable medium of claim 32 wherein the method further comprises, before the automatic generating of the at least one aggregate assessments of the content of the review, determining whether the received evaluations satisfy a content rating threshold, and wherein the automatic generating of the at least one aggregate assessments of the content of the review is performed only when it is determined that the received evaluations satisfy the content rating threshold.

38. The computer-readable medium of claim 32 wherein each of the received evaluations include quantitative assessments of the contents of the review for each of the multiple available content rating dimensions.

39. The computer-readable medium of claim 32 wherein the automatic generating of the at least one aggregate assessments of the content of the review includes generating multiple aggregate assessments that are each for one of the multiple available content rating dimensions, and wherein the method further comprises automatically generating an overall aggregate assessment of the review based at least in part on the multiple automatically generated aggregate assessments of the content of the review.

40. The computer-readable medium of claim 32 wherein the computer-readable medium is at least one of a memory of a computing device and a data transmission medium transmitting a generated data signal containing the contents.

41. The computer-readable medium of claim 32 wherein the contents are instructions that when executed cause the computing device to perform the method.

42. A computing device for selecting information to provide to users based on reputations of evaluators of the information, comprising:
one or more processors;
a content rater component configured to, when executed by at least one of the one or more processors:
receive from a reviewer user a review related to an item available from a Web merchant;
receive evaluations of the review from each of multiple evaluator users, each received evaluation including a quantitative assessment of contents of the review for each of one or more of multiple content rating dimensions available for use in assessing the review, each of the evaluator users having a single existing reputation weight for the Web merchant based at least in part on previous evaluations supplied by that evaluator user for multiple other reviews for items available from the Web merchant; and
automatically generate at least one aggregate assessment of the content of the review based at least in part on combining quantitative assessments from the received evaluations for the review, one or more of the generated aggregate assessments being further based on the single existing reputation weights of the evaluator users in such a manner that a first quantitative assessment from a first evaluator user with a first reputation weight has a different impact on that generated aggregate assessment than that first quantitative assessment from a distinct second evaluator user with a distinct second reputation weight;
an evaluator reputation assessor component configured to automatically update the single existing reputation weights for each of one or more of the evaluator users for the Web merchant based on a relationship of the quantitative assessments from the evaluation of that evaluator user to the quantitative assessments from the evaluations of other of the evaluator users; and
a content manager system configured to, when executed by at least one of the one or more processors, determine whether to provide the review to another user based at least in part on one or more of the automatically generated aggregate assessments for the content of the review.

43. The computing device of claim 42 wherein the relationship of the quantitative assessments from the evaluation of an evaluator user to the quantitative assessments from the evaluations of other of the evaluator users that is used when automatically updating the reputation weight for that evaluator user is based on a degree of agreement between the quantitative assessments from the evaluation of the evaluator user and quantitative assessments from a consensus evaluation for the received evaluations.

44. The computing device of claim 42 wherein the reputation weights of the evaluator users that are used in the automatic generating of the at least one aggregate assessments of the content of the review are automatically generated based on the previous evaluations by those evaluator users.

45. The computing device of claim 42 wherein the automatic generating of the at least one aggregate assessments of the content of the review is further based in part on an existing reputation weight of the reviewer user from which the review was received.

46. The computing device of claim 45 wherein the existing reputation weight of the reviewer user is based on a degree of consistency between one or more of the automatically generated aggregate assessments of the content of the review and automatically generated aggregate assessments of the content of previous reviews received from the reviewer user, and wherein the evaluator reputation assessor component is further configured to automatically update the reputation weight of the reviewer user from which the review was received based at least in part on one or more of the automatically generated at least one aggregate assessments of the content of the review.

47. The computing device of claim 42 wherein the content rater component is further configured to, before the automatic generating of the at least one aggregate assessments of the content of the review, determine whether the received evaluations satisfy a content rating threshold, and wherein the automatic generating of the at least one aggregate assessments of the content of the review is performed only when it is determined that the received evaluations satisfy the content rating threshold.

48. The computing device of claim 42 wherein each of the received evaluations include quantitative assessments of the contents of the review for each of the multiple available content rating dimensions.

49. The computing device of claim 42 wherein the automatic generating of the at least one aggregate assessments of the content of the review includes generating multiple aggregate assessments that are each for one of the multiple available content rating dimensions, and wherein the content rater component is further configured to automatically generate an overall aggregate assessment of the review based at least in part on the multiple automatically generated aggregate assessments of the content of the review.

50. The computing device of claim 42 wherein the content rater component and the evaluator reputation assessor component each include software instructions for execution in memory of the computing device.

51. The computing device of claim 42 wherein the content rater component consists of means for receiving from a reviewer user a review related to an available item, for receiving evaluations of the review from each of multiple evaluator users, each received evaluation including a quantitative assessment of contents of the review for each of one or more of multiple content rating dimensions available for use in assessing the review, each of the evaluator users having an existing reputation weight based at least in part on previous evaluations, and for automatically generating at least one aggregate assessment of the content of the review based at least in part on combining quantitative assessments from the received evaluations for the review, at least one of the generated aggregate assessments being further based on the reputation weights of the evaluator users in such a manner that a first quantitative assessment from a first evaluator user with a first reputation weight has a different impact on that generated aggregate assessment than that first quantitative assessment from a distinct second evaluator user with a distinct second reputation weight, wherein the evaluator reputation assessor component consists of means for automatically updating the reputation weights for each of one or more of the evaluator users based on a relationship of the quantitative assessments from the evaluation of that evaluator user to the quantitative assessments from the evaluations of other of the evaluator users, and wherein the content manager system consists of means for determining whether to provide the review to another user based at least in part on one or more of the automatically generated aggregate assessments for the content of the review.

52. The method of claim 29 wherein the automatic updating of the existing reputation weights of the one or more evaluator users is performed in a manner independent of the multiple additional users.

* * * * *

UNITED STATES PATENT AND TRADEMARK OFFICE
CERTIFICATE OF CORRECTION

PATENT NO. : 8,554,601 B1  
APPLICATION NO. : 10/646341  
DATED : October 8, 2013  
INVENTOR(S) : Brian David Marsh et al.

It is certified that error appears in the above-identified patent and that said Letters Patent is hereby corrected as shown below:

On Title Page 2, References Cited

Item (56):
"Welcome to the Reputation Research Network (1 page) http://data-bases.si.umich.edu/reputations/indexM.cfm [Accessed August 4, 2003]." should read, --Welcome to the Reputation Research Network (1 page) http://databases.si.umich.edu/reputations/indexM.cfm [Accessed August 4, 2003].--.

Item (56):
"Papers on Reputation (7 pages) http://databases.si.umich.edu/repu-tations/bib/bibM.cfm [Accessed August 4, 2003]." should read, --Papers on Reputation (7 pages) http://databases.si.umich.edu/reputations/bib/bibM.cfm [Accessed August 4, 2003].--.

Item (56):
"eBay, Company Overview (2 pages) http://pages.ebay.com/commu-nity/aboutbay/overview/index.html [Accessed August 4, 2003]." should read, --eBay, Company Overview (2 pages) http://pages.ebay.com/community/aboutbay/overview/index.html [Accessed August 4, 2003].--.

Item (56):
"Amazon.com, Frequently Asked Questions About Reviewers (3 pages) http://www.amazon.com/exec/obidos/subst/community/re-viewers-faq.html/ref+cm_tr_trl_faq/104-1986906-044793 [Accessed July 31, 2003]." should read, --Amazon.com, Frequently Asked Questions About Reviewers (3 pages) http://www.amazon.com/exec/obidos/subst/community/reviewers-faq.html/ref+cm_tr_trl_faq/104-1986906-044793 [Accessed July 31, 2003].--.

Signed and Sealed this
Sixteenth Day of September, 2014

Michelle K. Lee
*Deputy Director of the United States Patent and Trademark Office*